(12) United States Patent
Ren et al.

(10) Patent No.: US 12,413,989 B2
(45) Date of Patent: Sep. 9, 2025

(54) INFORMATION INDICATION METHOD AND APPARATUS, AND COMMUNICATION DEVICE

(71) Applicant: DATANG MOBILE COMMUNICATIONS EQUIPMENT CO., LTD., Beijing (CN)

(72) Inventors: Xiaotao Ren, Beijing (CN); Ren Da, Beijing (CN); Bin Ren, Beijing (CN); Haiyang Quan, Beijing (CN); Hui Li, Beijing (CN); Jianxiang Li, Beijing (CN); Gang Li, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 386 days.

(21) Appl. No.: 18/002,913

(22) PCT Filed: Mar. 16, 2021

(86) PCT No.: PCT/CN2021/081031
§ 371 (c)(1),
(2) Date: Dec. 22, 2022

(87) PCT Pub. No.: WO2021/258786
PCT Pub. Date: Dec. 30, 2021

(65) Prior Publication Data
US 2023/0247451 A1 Aug. 3, 2023

(30) Foreign Application Priority Data

Jun. 24, 2020 (CN) .......................... 202010589872.1

(51) Int. Cl.
*G01R 31/08* (2020.01)
*G06F 11/00* (2006.01)
(Continued)

(52) U.S. Cl.
CPC ........... *H04W 24/08* (2013.01); *H04W 24/10* (2013.01)

(58) Field of Classification Search
CPC ..... H04W 24/08; H04W 24/10; H04W 64/00; G01S 5/0244; G01S 5/0278;
(Continued)

(56) References Cited

U.S. PATENT DOCUMENTS 6,215,442 B1 * 4/2001 Sheynblat ............... G01S 19/09
342/357.62
6,496,778 B1 * 12/2002 Lin .......................... G01S 19/55
701/472
(Continued)

FOREIGN PATENT DOCUMENTS

CN 104570009 A 4/2015
CN 108415042 A 8/2018
(Continued)

OTHER PUBLICATIONS

European Search Report issued Nov. 20, 2023 in European Application No. 21830116.6.
(Continued)

*Primary Examiner* — Stephen M D Agosta
(74) *Attorney, Agent, or Firm* — Harness, Dickey & Pierce, P.L.C.

(57) ABSTRACT

An information indication method, an information indication apparatus and a communication device are provided. The method includes: obtaining first quality indication information according to first measurement metrics; reporting the first quality indication information; wherein, the first quality indication information includes at least one of following: indication information of carrier phase continuity, indication information of half cycle ambiguity, indication information of an error indication value, indication information of an
(Continued)

error resolution, indication information of a carrier signal quality, indication information of a quantity of error sampling points, and indication information of a measurement confidence level.

21 Claims, 5 Drawing Sheets

(51) Int. Cl.
| | |
|---|---|
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |
| H04W 24/08 | (2009.01) |
| H04W 24/10 | (2009.01) |

(58) Field of Classification Search
CPC . G01S 5/0205; G01S 5/06; H04L 1/20; H04L 1/0026; H04B 17/309; H04B 17/336
See application file for complete search history.

(56) References Cited

U.S. PATENT DOCUMENTS

| | | | | |
|---|---|---|---|---|
| 6,832,155 | B2* | 12/2004 | Draganov | G01S 19/44 342/422 |
| 7,002,513 | B2* | 2/2006 | Brabec | G01C 15/002 342/357.27 |
| 7,117,417 | B2* | 10/2006 | Sharpe | G01S 19/072 701/472 |
| 7,439,908 | B1* | 10/2008 | Zhodzishsky | G01S 19/43 342/357.44 |
| 8,711,759 | B2* | 4/2014 | Bhaskar | H04B 7/2125 370/316 |
| 9,030,355 | B2* | 5/2015 | Jarvis | G01S 19/252 342/357.25 |
| 9,083,503 | B2* | 7/2015 | Sagen | H04L 7/0079 |
| 9,086,479 | B2* | 7/2015 | Pratt | G01S 19/28 |
| 9,146,319 | B2* | 9/2015 | Leandro | G01S 19/44 |
| 9,158,002 | B2* | 10/2015 | Pratt | G01S 19/42 |
| 9,182,497 | B2* | 11/2015 | Geier | G01S 19/49 |
| 9,270,442 | B2* | 2/2016 | Rice | H04L 7/0041 |
| 9,306,676 | B1* | 4/2016 | Castrillon | H04L 1/0054 |
| 9,322,922 | B2* | 4/2016 | Pratt | G01S 19/43 |
| 9,425,652 | B2* | 8/2016 | Rippon | H02J 13/0004 |
| 9,520,860 | B2* | 12/2016 | Whitehead | H04J 3/0644 |
| 9,590,411 | B2* | 3/2017 | Achanta | H02H 1/0061 |
| 9,599,719 | B2* | 3/2017 | Achanta | G01S 19/20 |
| 9,654,235 | B1* | 5/2017 | Fraiser | H04B 17/23 |
| 9,709,680 | B2* | 7/2017 | Achanta | G01S 19/215 |
| 9,709,682 | B2* | 7/2017 | Achanta | H04K 3/90 |
| 9,759,816 | B2* | 9/2017 | Achanta | G01S 19/215 |
| 9,760,062 | B2* | 9/2017 | Achanta | G04F 10/10 |
| 9,813,173 | B2* | 11/2017 | Achanta | H04J 3/0644 |
| 10,191,157 | B2* | 1/2019 | Dai | G01S 19/071 |
| 10,274,632 | B1* | 4/2019 | Olsson | G01S 19/00 |
| 10,375,108 | B2* | 8/2019 | Schweitzer, III | G06F 11/0709 |
| 10,386,496 | B2* | 8/2019 | Dai | G01S 19/072 |
| 10,527,732 | B2* | 1/2020 | Sagen | G01S 19/01 |
| 10,564,293 | B2* | 2/2020 | Zhang | G01S 19/071 |
| 10,571,578 | B2* | 2/2020 | Sun | G01S 19/46 |
| 10,912,104 | B2* | 2/2021 | Witt | H04W 72/121 |
| 10,948,609 | B1* | 3/2021 | Schnaufer | G01S 19/55 |
| 11,092,716 | B1* | 8/2021 | Pust | G01S 19/14 |
| 11,150,352 | B2* | 10/2021 | Kuntz | G01S 19/37 |
| 11,737,733 | B2* | 8/2023 | Sboros | A61B 8/481 600/458 |
| 2004/0225438 | A1* | 11/2004 | Draganov | G01S 19/44 342/357.44 |
| 2005/0024263 | A1* | 2/2005 | Sharpe | G01S 19/072 342/357.31 |
| 2005/0063496 | A1* | 3/2005 | Guillouard | H04L 27/2647 370/210 |
| 2005/0101248 | A1* | 5/2005 | Vollath | G01S 19/44 342/357.27 |
| 2006/0012521 | A1* | 1/2006 | Small | G01S 5/0215 342/464 |
| 2006/0047413 | A1* | 3/2006 | Lopez | G01S 19/42 701/532 |
| 2007/0237269 | A1* | 10/2007 | Lillo | H04B 1/7085 342/357.3 |
| 2009/0268857 | A1* | 10/2009 | Chen | H04L 7/0029 375/351 |
| 2009/0279594 | A1* | 11/2009 | Muhammad | G06F 9/4812 375/219 |
| 2009/0303116 | A1 | 12/2009 | Wirola et al. | |
| 2010/0322094 | A1* | 12/2010 | Allpress | H04W 72/02 370/252 |
| 2011/0170496 | A1* | 7/2011 | Fong | H04W 52/24 370/329 |
| 2011/0207477 | A1* | 8/2011 | Siomina | G01S 5/0244 455/67.11 |
| 2011/0210889 | A1 | 9/2011 | Dai et al. | |
| 2012/0182181 | A1* | 7/2012 | Dai | G01S 19/41 342/357.31 |
| 2013/0010716 | A1* | 1/2013 | Dinan | H04W 76/15 370/329 |
| 2013/0234885 | A1* | 9/2013 | Geier | G01S 19/49 342/357.23 |
| 2013/0293415 | A1 | 11/2013 | Gutt et al. | |
| 2014/0002299 | A1* | 1/2014 | Leandro | G01S 19/11 342/357.27 |
| 2014/0241309 | A1* | 8/2014 | Hilton | H04L 5/0046 370/468 |
| 2014/0281832 | A1* | 9/2014 | Zhang | H04B 10/541 714/776 |
| 2015/0133126 | A1* | 5/2015 | Liu | H04W 76/16 455/437 |
| 2015/0253431 | A1* | 9/2015 | Averin | G01S 19/072 342/357.26 |
| 2015/0268350 | A1* | 9/2015 | Whitehead | G01S 3/46 342/357.59 |
| 2016/0007262 | A1* | 1/2016 | Dinan | H04W 36/0064 370/332 |
| 2016/0231433 | A1* | 8/2016 | Ivanov | G01S 11/10 |
| 2016/0359601 | A1* | 12/2016 | Xu | H04L 5/0048 |
| 2017/0276794 | A1* | 9/2017 | Tollkühn | G01S 19/22 |
| 2018/0074206 | A1* | 3/2018 | Niesen | G01S 19/22 |
| 2018/0074212 | A1* | 3/2018 | Niesen | G01S 19/393 |
| 2018/0372881 | A1* | 12/2018 | Michaelis | G01S 19/53 |
| 2019/0120973 | A1* | 4/2019 | Martin | G01S 19/256 |
| 2019/0141554 | A1 | 5/2019 | Siomina et al. | |
| 2019/0302274 | A1* | 10/2019 | Berntorp | G01S 19/393 |
| 2019/0339396 | A1 | 11/2019 | Turunen | |
| 2020/0041604 | A1 | 2/2020 | Kim et al. | |
| 2020/0145077 | A1 | 5/2020 | Sarkis et al. | |
| 2020/0322915 | A1* | 10/2020 | Zhang | G01S 19/05 |
| 2020/0408871 | A1 | 12/2020 | Da et al. | |
| 2021/0396890 | A1* | 12/2021 | Liu | G01S 19/396 |
| 2022/0043099 | A1 | 2/2022 | Da et al. | |

FOREIGN PATENT DOCUMENTS

| | | |
|---|---|---|
| CN | 109031380 A | 12/2018 |
| CN | 110062457 A | 7/2019 |
| EP | 1729145 A1 | 12/2006 |
| JP | 2008-122293 A | 5/2008 |
| JP | 2009-539095 A | 11/2009 |
| JP | 2018-179734 A | 11/2018 |
| KR | 10-2009-0091449 A | 8/2009 |
| WO | WO-2014/047824 A1 | 4/2014 |
| WO | WO-2019/032004 A1 | 2/2019 |
| WO | WO-2019/141090 A1 | 7/2019 |
| WO | WO-2020/0125310 A1 | 6/2020 |

(56) References Cited

OTHER PUBLICATIONS

Nokia, "Feasibility of adding carrier phase-assistance," 3GPP TSG-GERAN Meeting #34, GP-070835, Shenzhen, China, May 14, 2007.
Qualcomm Inc., "UE Measurements for RTK," 3GPP TSG-RAN WG2 Meeting #99, R2-1708520, Berlin, Germany, Aug. 21, 2017.
Darugna et al., "RTK and PPP-RTK Using Smartphones: From Short-Baseline to Long- Baseline Applications," 32nd International Technical Meeting of the Satellite Division of the Institute of Navigation, Sep. 16, 2019.
Notice of Reasons for Refusal issued Dec. 5, 2023 in Japanese Application No. 2022-580184.
Office Action issued May 27, 2023 in Chinese Application No. 202010589872.1.
Written Opinion and International Search Report issued Jun. 8, 2021 in International Application No. PCT/CN2021/081031.
Request for the submission of an Opinion issued Apr. 24, 2025 in Korean Application No. 10-2023-7002418.

\* cited by examiner

INFORMATION INDICATION METHOD AND APPARATUS, AND COMMUNICATION DEVICE

CROSS-REFERENCE TO RELATED APPLICATIONS

This application is a U.S. national phase application of a PCT Application No. PCT/CN2021/081031 fled on Mar. 16, 2021 which claims a priority to Chinese Patent Application No. 202010589872.1 filed in China on Jun. 24, 2020, the disclosures of which are incorporated in their entirety by reference herein.

TECHNICAL FIELD

The present disclosure relates to the field of communications technology, in particular, relates to an information indication method, an information indication apparatus, and a communication device.

BACKGROUND

A plurality of UE (terminal) positioning methods that support positioning calculation by measuring a positioning reference signal of a radio communication system is defined in the related art. The methods mainly include time-delay-based DL-TDOA (Downlink Time Difference Of Arrival) and/or UL-TDOA (Uplink Time Difference Of Arrival) positioning methods, angle-based DL-AoD (Downlink Angle-of-Departure) and/or UL-AOA (Uplink Angle-of-Arrival) positioning methods, and the like. These methods are characterized by positioning based on a positioning reference signal specified in a radio communication system, and can operate in an environment where no GNSS (Global Navigation Satellite System) signal is received. The time-delay-based DL-TDOA and UL-TDOA positioning methods estimate a position of a terminal by a relative time delay between base stations according to difference between propagation distances of the terminal with respect to the base stations. The angle-based DL-AoD and UL-AOA positioning methods determine the position of the terminal by a plurality of angle parameters according to a relative angle direction between the terminal and the base station.

The traditional time-delay-based positioning methods (such as DL-TDOA and/or UL-TDOA) convert the difference of arrival time into a distance difference, thereby performing positioning. However, such positioning method is limited by a signal bandwidth and a receiver resolution, and a positioning accuracy is difficult to reach a centimeter level. The angle-based positioning methods (such as DL-AoD and/or UL-AOA) also have similar deficiencies. Therefore, in order to improve a positioning accuracy in radio networks, it is necessary to find more accurate positioning methods.

In order to improve the positioning accuracy, it is necessary to introduce a carrier phase positioning method. The carrier phase positioning method estimates the position of the terminal by a relative phase between the base stations according to the difference between the propagation distances of the terminal with respect to the base stations. The carrier phase positioning method has the advantage of high positioning accuracy, which can reach a centimeter level. Specifically, the carrier phase positioning method uses carrier phases of measured signals to extract propagation distance information therein. Under a condition of LOS (Line Of Sight), the measurement error of a carrier phase is a small fraction of a carrier wavelength, considering that the carrier wavelength is in the order of decimeters (or centimeters), the accuracy of this positioning method can also be in the order of centimeters (or millimeters).

Specifically, downlink carrier phase positioning is taken as an example, if a DL-PRS (downlink positioning reference signal) is used as a positioning reference signal, specifically referring to FIG. 1, a downlink carrier phase positioning method includes following:

(1) each base station gNB (e.g., gNB1, gNB2, gNB3) sends a periodic DL-PRS signal to the terminal;

(2) the UE obtains, according to carrier phase assistance data provided by an LMF (Location Management Function), configuration information of downlink positioning reference signals (DL-PRS) transmitted by gNBs around the UE and receives the DL-PRS of each gNB; first, the UE estimates carrier phase measurement values with the gNB sand other positioning measurement metrics, such as a plurality of time differences of arrival TDOA (Downlink Reference Signal Time Difference DL RSTD, Uplink Relative Arrival Time UL RTOA, etc.), and then calculates and obtains a downlink reference signal arrival phase difference (DL-PRS RSPD);

(3) a plurality of DL-PRS RSPDs, a plurality of TDOAs, and other known information (e.g., geographical coordinates of a gNB) obtained by the UE may be used to calculate the position of the UE in a network-based positioning manner or a UE-based positioning manner.

A) If a network-based positioning method is adopted, the UE reports an obtained DL-PRS RSPD measurement value to a LMF, and the LMF calculates the position of the UE by using the reported measurement value and other known information (such as geographical coordinates of the gNB).

B) If a UE-based positioning method is adopted, the UE calculates the position of the UE by using the obtained DL-PRS RSPD and other information (such as the geographical coordinates of the gNB) provided by the network.

Further, if the carrier phase positioning method is adopted, while reporting the phase measurement metrics, the quality of the measurement metrics may also be indicated, so that a receiving end of receiving the measurement metrics judges the quality and the reliability of the current measurement, and performs corresponding data repair or data discard and the like. However, in that relate art, there is no quality indication scheme suitable for the measurement metrics of the carrier phase positioning method in the NR (New Radio) system, which may cause problems such as low positioning accuracy and poor reliability of the carrier phase positioning method in the related art.

SUMMARY

It is an objective of the present disclosure to provide an information indication method, an information indication apparatus and a communication device, in order to solve the problem that incapability of knowing the quality of the measurement metrics in the carrier phase positioning solution in the related art may lead to low positioning accuracy and poor reliability.

In order to address the above technical problem, the embodiments of the present disclose provide an information indication method performed by a communication device, the method includes: obtaining first quality indication information according to first measurement metrics; reporting the first quality indication information; wherein, the first quality indication information includes at least one of following:

indication information of carrier phase continuity, indication information of half cycle ambiguity, indication information of an error indication value, indication information of an error resolution, indication information of a carrier signal quality, indication information of a quantity of error sampling points, and indication information of a measurement confidence level.

Optionally, the indication information of the carrier phase continuity is configured to characterize continuity of carrier phase measurement metrics or continuity of a cumulative amount of carrier phase measurement metrics.

Optionally, the continuity of the carrier phase measurement metrics means whether the carrier phase measurement metrics has a cycle slip or not; in case that there is the cycle slip, the carrier phase measurement metrics is discontinuous; in case that there is no cycle slip, the carrier phase measurement metrics is continuous; or the continuity of the cumulative amount of the carrier phase measurement metrics means whether there is a cycle slip in the cumulative amount of the carrier phase measurement metrics or not; in the case that there is the cycle slip, the cumulative amount of the carrier phase measurement metrics is discontinuous; in the case that there is no cycle slip, the cumulative amount of the carrier phase measurement metrics is continuous.

Optionally, reporting the first quality indication information includes: adopting 1 bit to represent the carrier phase continuity, wherein in a case that a value of the 1 bit is a first value, that a carrier phase is continuous is indicated; and in a case that the value of the 1 bit is a second value, that the carrier phase is discontinuous is indicated.

Optionally, the indication information of the half cycle ambiguity is configured to indicate whether received data has the half cycle ambiguity.

Optionally, reporting the first quality indication information includes: adopting 1 bit to represent the half cycle ambiguity, wherein in a case that a value of the 1 bit is a first value, that the received data has the half cycle ambiguity is indicated; and in a case that the value of the 1 bit is a second value, that the received data does not have the half cycle ambiguity is indicated.

Optionally, the indication information of the error indication value is configured to characterize a first estimation value of the first measurement metrics; and/or, the indication information of the error resolution is configured to characterize a step length of quantization of an indication field in which the error indication value is located; and/or, the indication information of the carrier signal quality is configured to characterize a carrier-to-noise ratio (CNR) or a signal-to-noise ratio (SNR) of a carrier on which the first measurement metrics is located, and/or, the indication information of the quantity of error sampling points is configured to characterize the quantity of the first measurement metrics used in calculating the error indication value.

Optionally, the indication information of the error indication value is configured to characterize a maximum value between a first error value and a second error value; wherein, the first error value is an error value when an error sampling point of the first measurement metrics is at a first position, and the second error value is an error value when an error sampling point of the first measurement metrics is at a second position; the first position is a position corresponding to a case that an independent variable of a probability density function corresponding to a measurement error value of an error sampling point of the first measurement metrics is $-K \times \sigma$, the second position is a position corresponding to a case that an independent variable of a probability density function corresponding to a measurement error value of an error sampling point of the first measurement metrics is $K \times \sigma$, wherein K is a natural number, $\sigma$ is a standard deviation statistically obtained according to measurement error values of at least two error sampling points of the first measurement metrics when the measurement error values of the at least two error sampling points of the first measurement metrics follow a normal distribution.

Optionally, the indication information of the measurement confidence level means a probability that a measurement error value of an error sampling point of the first measurement metrics is within a preset confidence interval, wherein, the preset confidence interval is a preset interval of an independent variable of a probability density function corresponding to the measurement error value of the error sampling point of the first measurement metrics; or, the indication information of the measurement confidence level means a maximum value between a first probability value and a second probability value, wherein, the first probability value is a probability value that a measurement error value of an error sampling point of the first measurement metrics is at a first position, and the second probability value is a probability value that a measurement error value of an error sampling point of the first measurement metrics is at a second position; the first position is a position corresponding to a case that an independent variable of a probability density function corresponding to a measurement error value of an error sampling point of the first measurement metrics is $-K \times \sigma$; the second position is a position corresponding to a case that an independent variable of a probability density function corresponding to a measurement error value of an error sampling point of the first measurement metrics is $K \times \sigma$, wherein K is a natural number, $\sigma$ is a standard deviation statistically obtained according to measurement error values of at least two error sampling points of the first measurement metrics when the measurement error values of the at least two error sampling points of the first measurement metrics follow a normal distribution.

Optionally, there is a one-to-one mapping relationship between the first quality indication information and a measurement type of the first measurement metrics.

Optionally, in a case where the first measurement metrics follow a normal distribution, the first quality indication information indicates error indication values at $\pm K \times \sigma$; or in a case where the first measurement metrics follow a uniform distribution, the first quality indication information indicates an average value of error indication values, wherein K is a natural number and $\sigma$ is a standard deviation statistically obtained according to measurement error values of at least two error sampling points of the first measurement metrics, in a case that the measurement error values of the at least two error sampling points of the first measurement metrics follow the normal distribution.

Optionally, the first measurement metrics are carrier phase measurement metrics, and the carrier phase measurement metrics include an entire cycle phase value, or an intra-cycle phase value, or an entire cycle phase value and an intra-cycle phase value.

Optionally, sub-messages included in the quality indication information corresponding to the entire cycle phase value are different from at least one of sub-messages included in the quality indication information corresponding to the intra-cycle phase value, wherein, the sub-messages included in the quality indication information include: at least one of following: the indication information of the carrier phase continuity, the indication information of the half cycle ambiguity, the indication information of the error indication value, the indication information of the error resolution, the indication information of the carrier signal quality, the indication information of the quantity of error sampling points, and the indication information of the measurement confidence level.

The embodiments of the present disclosure further provide a communication device. The communication includes: a memory, a processor, a transceiver and a program stored on the memory and executable on the processor, wherein when the processor executes the program, the processor implements following steps: obtaining first quality indication information according to first measurement metrics; reporting the first quality indication information using the transceiver; wherein, the first quality indication information includes at least one of following: indication information of carrier phase continuity, indication information of half cycle ambiguity, indication information of an error indication value, indication information of an error resolution, indication information of a carrier signal quality, indication information of a quantity of error sampling points, and indication information of a measurement confidence level.

Optionally, the indication information of the carrier phase continuity is configured to characterize continuity of carrier phase measurement metrics or continuity of a cumulative amount of carrier phase measurement metrics.

Optionally, the continuity of the carrier phase measurement metrics means whether the carrier phase measurement metrics has a cycle slip or not; in case that there is the cycle slip, the carrier phase measurement metrics is discontinuous; in case that there is no cycle slip, the carrier phase measurement metrics is continuous; or the continuity of the cumulative amount of the carrier phase measurement metrics means whether there is a cycle slip in the cumulative amount of the carrier phase measurement metrics or not; in the case that there is the cycle slip, the cumulative amount of the carrier phase measurement metrics is discontinuous; in the case that there is no cycle slip, the cumulative amount of the carrier phase measurement metrics is continuous.

Optionally, the processor is particularly configured to implement following when executing the program: adopting 1 bit to represent the carrier phase continuity, wherein in a case that a value of the 1 bit is a first value, that a carrier phase is continuous is indicated; and in a case that the value of the 1 bit is a second value, that the carrier phase is discontinuous is indicated.

Optionally, the indication information of the half cycle ambiguity is configured to indicate whether received data has the half cycle ambiguity.

Optionally, the processor is particularly configured to implement following when executing the program: adopting 1 bit to represent the half cycle ambiguity, wherein in a case that a value of the 1 bit is a first value, that the received data has the half cycle ambiguity is indicated; and in a case that the value of the 1 bit is a second value, that the received data does not have the half cycle ambiguity is indicated.

Optionally, the indication information of the error indication value is configured to characterize a first estimation value of the first measurement metrics; and/or, the indication information of the error resolution is configured to characterize a step length of quantization of an indication field in which the error indication value is located; and/or, the indication information of the carrier signal quality is configured to characterize a carrier-to-noise ratio (CNR) or a signal-to-noise ratio (SNR) of a carrier on which the first measurement metrics is located; and/or, the indication information of the quantity of error sampling points is configured to characterize the quantity of the first measurement metrics used in calculating the error indication value.

Optionally, the indication information of the error indication value is configured to characterize a maximum value between a first error value and a second error value; wherein, the first error value is an error value when an error sampling point of the first measurement metrics is at a first position, and the second error value is an error value when an error sampling point of the first measurement metrics is at a second position; the first position is a position corresponding to a case that an independent variable of a probability density function corresponding to a measurement error value of an error sampling point of the first measurement metrics is $-K \times \sigma$, the second position is a position corresponding to a case that an independent variable of a probability density function corresponding to a measurement error value of an error sampling point of the first measurement metrics is $K \times \sigma$, wherein K is a natural number, $\sigma$ is a standard deviation statistically obtained according to measurement error values of at least two error sampling points of the first measurement metrics when the measurement error values of the at least two error sampling points of the first measurement metrics follow a normal distribution.

Optionally, the indication information of the measurement confidence level means a probability that a measurement error value of an error sampling point of the first measurement metrics is within a preset confidence interval, wherein, the preset confidence interval is a preset interval of an independent variable of a probability density function corresponding to the measurement error value of the error sampling point of the first measurement metrics; or, the indication information of the measurement confidence level means a maximum value between a first probability value and a second probability value, wherein, the first probability value is a probability value that a measurement error value of an error sampling point of the first measurement metrics is at a first position, and the second probability value is a probability value that a measurement error value of an error sampling point of the first measurement metrics is at a second position; the first position is a position corresponding to a case that an independent variable of a probability density function corresponding to a measurement error value of an error sampling point of the first measurement metrics is $-K \times \sigma$; the second position is a position corresponding to a case that an independent variable of a probability density function corresponding to a measurement error value of an error sampling point of the first measurement metrics is $K \times \sigma$, wherein K is a natural number, $\sigma$ is a standard deviation statistically obtained according to measurement error values of at least two error sampling points of the first measurement metrics when the measurement error values of the at least two error sampling points of the first measurement metrics follow a normal distribution.

Optionally, there is a one-to-one mapping relationship between the first quality indication information and a measurement type of the first measurement metrics.

Optionally, in a case where the first measurement metrics follow a normal distribution, the first quality indication information indicates error indication values at $\pm K \times \sigma$; or in a case where the first measurement metrics follow a uniform distribution, the first quality indication information indicates an average value of error indication values, wherein K is a natural number and $\sigma$ is a standard deviation statistically obtained according to measurement error values of at least two error sampling points of the first measurement metrics, in a case that the measurement error values of the at least two error sampling points of the first measurement metrics follow the normal distribution.

Optionally, the first measurement metrics are carrier phase measurement metrics, and the carrier phase measurement metrics include an entire cycle phase value, or an intra-cycle phase value, or an entire cycle phase value and an intra-cycle phase value.

Optionally, sub-messages included in the quality indication information corresponding to the entire cycle phase value are different from at least one of sub-messages included in the quality indication information corresponding to the intra-cycle phase value, wherein, the sub-messages included in the quality indication information include: at least one of following: the indication information of the carrier phase continuity, the indication information of the half cycle ambiguity, the indication information of the error indication value, the indication information of the error resolution, the indication information of the carrier signal quality, the indication information of the quantity of error sampling points, and the indication information of the measurement confidence level.

The embodiments of the present disclosure further provide a readable storage medium having stored thereon a program, wherein when the program is executed by a processor, the processor implements the steps of the information indication method.

The embodiments of the present disclosure further provide an information indication apparatus applied to a communication device, the apparatus includes: a first obtaining module, configured to obtain first quality indication information according to a first measurement metrics; a first reporting module, configured to report the first quality indication information; wherein, the first quality indication information includes at least one of following: indication information of carrier phase continuity, indication information of half cycle ambiguity, indication information of an error indication value, indication information of an error resolution, indication information of a carrier signal quality, indication information of a quantity of error sampling points, and indication information of a measurement confidence level.

Optionally, the indication information of the carrier phase continuity is configured to characterize continuity of carrier phase measurement metrics or continuity of a cumulative amount of carrier phase measurement metrics.

Optionally, the continuity of the carrier phase measurement metrics means whether the carrier phase measurement metrics has a cycle slip or not; in case that there is the cycle slip, the carrier phase measurement metrics is discontinuous; in case that there is no cycle slip, the carrier phase measurement metrics is continuous; or the continuity of the cumulative amount of the carrier phase measurement metrics means whether there is a cycle slip in the cumulative amount of the carrier phase measurement metrics or not; in the case that there is the cycle slip, the cumulative amount of the carrier phase measurement metrics is discontinuous; in the case that there is no cycle slip, the cumulative amount of the carrier phase measurement metrics is continuous.

Optionally, the first reporting module includes a first processing sub-module, configured to adopt 1 bit to represent the carrier phase continuity, wherein in a case that a value of the 1 bit is a first value, that a carrier phase is continuous is indicated; and in a case that the value of the 1 bit is a second value, that the carrier phase is discontinuous is indicated.

Optionally, the indication information of the half cycle ambiguity is configured to indicate whether received data has the half cycle ambiguity.

Optionally, the first reporting module includes a second processing sub-module, configured to adopt 1 bit to represent the half cycle ambiguity, wherein in a case that a value of the 1 bit is a first value, that the received data has the half cycle ambiguity is indicated; and in a case that the value of the 1 bit is a second value, that the received data does not have the half cycle ambiguity is indicated.

Optionally, the indication information of the error indication value is configured to characterize a first estimation value of the first measurement metrics; and/or, the indication information of the error resolution is configured to characterize a step length of quantization of an indication field in which the error indication value is located; and/or, the indication information of the carrier signal quality is configured to characterize a carrier-to-noise ratio (CNR) or a signal-to-noise ratio (SNR) of a carrier on which the first measurement metrics is located, and/or, the indication information of the quantity of error sampling points is configured to characterize the quantity of the first measurement metrics used in calculating the error indication value.

Optionally, the indication information of the error indication value is configured to characterize a maximum value between a first error value and a second error value; wherein, the first error value is an error value when an error sampling point of the first measurement metrics is at a first position, and the second error value is an error value when an error sampling point of the first measurement metrics is at a second position; the first position is a position corresponding to a case that an independent variable of a probability density function corresponding to a measurement error value of an error sampling point of the first measurement metrics is $-K \times \sigma$, the second position is a position corresponding to a case that an independent variable of a probability density function corresponding to a measurement error value of an error sampling point of the first measurement metrics is $K \times \sigma$, wherein K is a natural number, $\sigma$ is a standard deviation statistically obtained according to measurement error values of at least two error sampling points of the first measurement metrics when the measurement error values of the at least two error sampling points of the first measurement metrics follow a normal distribution.

Optionally, the indication information of the measurement confidence level means a probability that a measurement error value of an error sampling point of the first measurement metrics is within a preset confidence interval, wherein, the preset confidence interval is a preset interval of an independent variable of a probability density function corresponding to the measurement error value of the error sampling point of the first measurement metrics; or, the indication information of the measurement confidence level means a maximum value between a first probability value and a second probability value, wherein, the first probability value is a probability value that a measurement error value of an error sampling point of the first measurement metrics is at a first position, and the second probability value is a probability value that a measurement error value of an error sampling point of the first measurement metrics is at a second position; the first position is a position corresponding to a case that an independent variable of a probability density function corresponding to a measurement error value of an error sampling point of the first measurement metrics is $-K \times \sigma$; the second position is a position corresponding to a case that an independent variable of a probability density function corresponding to a measurement error value of an error sampling point of the first measurement metrics is $K \times \sigma$, wherein K is a natural number, $\sigma$ is a standard deviation statistically obtained according to measurement error values of at least two error sampling points of the first measurement metrics when the measurement error values of the at least two error sampling points of the first measurement metrics follow a normal distribution.

Optionally, there is a one-to-one mapping relationship between the first quality indication information and a measurement type of the first measurement metrics.

Optionally, in a case where the first measurement metrics follow a normal distribution, the first quality indication information indicates error indication values at $\pm K \times \sigma$; or in a case where the first measurement metrics follow a uniform distribution, the first quality indication information indicates an average value of error indication values, wherein K is a natural number and $\sigma$ is a standard deviation statistically obtained according to measurement error values of at least two error sampling points of the first measurement metrics, in a case that the measurement error values of the at least two error sampling points of the first measurement metrics follow the normal distribution.

Optionally, the first measurement metrics are carrier phase measurement metrics, and the carrier phase measurement metrics include an entire cycle phase value, or an intra-cycle phase value, or an entire cycle phase value and an intra-cycle phase value.

Optionally, sub-messages included in the quality indication information corresponding to the entire cycle phase value are different from at least one of sub-messages included in the quality indication information corresponding to the intra-cycle phase value, wherein, the sub-messages included in the quality indication information include: at least one of following: the indication information of the carrier phase continuity, the indication information of the half cycle ambiguity, the indication information of the error indication value, the indication information of the error resolution, the indication information of the carrier signal quality, the indication information of the quantity of error sampling points, and the indication information of the measurement confidence level.

The advantageous effects of the above technical solutions of the present disclosure are as follows:

The information indication method obtains the first quality indication information according to the first measurement metrics, reports the first quality indication information, the first quality indication information includes at least one of: carrier phase continuity indication information, half cycle ambiguity indication information, error indication value indication information, error resolution indication information, and carrier signal quality indication information, and error sampling point quantity indication information and measurement confidence level indication information; the quality indication information such as carrier phase continuity, half cycle ambiguity, an error indication value, an error resolution, a carrier signal quality, the quantity of error sampling points and a measurement confidence level can be reported, and the receiving end may judge the quality and the reliability of the current measurement, and repair or discard the corresponding reported data, etc. UE position deviation caused by positioning calculation performed by the receiving end using the reported value of measurement with a poor quality is avoided, the positioning accuracy and the reliability of the system may be improved, and the problem of low positioning accuracy and the poor reliability caused by incapability of knowing the quality of measurement metric in the carrier phase position scheme in the related art.

DETAILED DESCRIPTION

In order to make the technical problems, technical solutions and advantages to be solved by the present disclosure more clear, a detailed description will be given below with reference to the drawings and specific embodiments.

Figure 1:
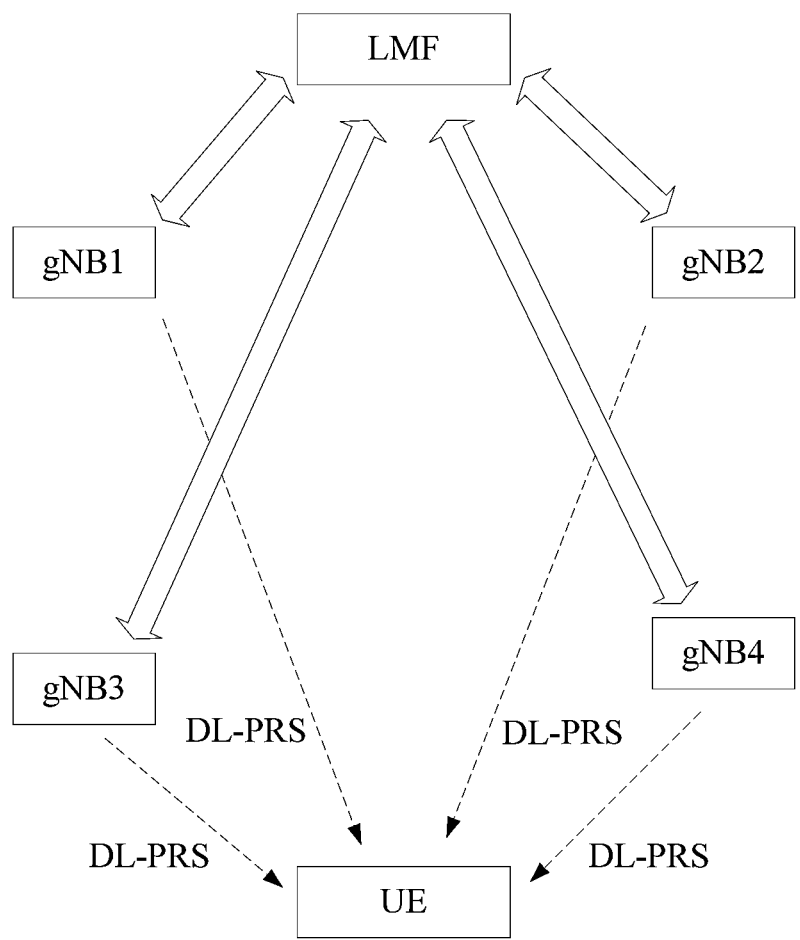
FIG. 1 is a schematic diagram of a carrier phase positioning method in the related art.
Figure 2:
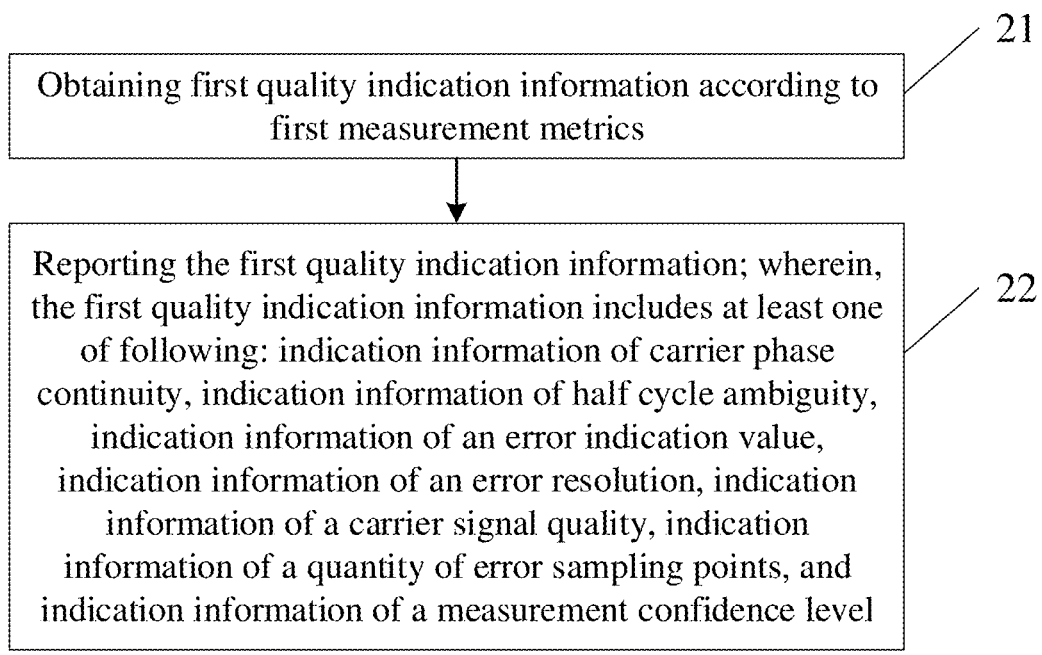
FIG. 2 is a flowchart of an information indication method according to an embodiment of the present disclosure.

For a purpose of solving the problem that inability of knowing the quality of measurement metrics in a carrier phase position solution in the related art may result in low positioning accuracy and poor reliability, the present disclosure provides an information indication method performed by a communication device. As shown in FIG. 2, the method includes steps 21-22.

Step 21: obtaining first quality indication information according to first measurement metrics.

Step 22: reporting the first quality indication information.

The first quality indication information includes at least one of carrier phase continuity indication information, half cycle ambiguity indication information, error indication value indication information, error resolution indication information, and carrier signal quality indication information, and error sampling point quantity indication information and measurement confidence level indication information.

In the embodiment of the present disclosure, the communication device may be a terminal or a network side device (such as a base station), and is not limited herein.

The information indication method according to the embodiment of the present disclosure obtains the first quality indication information according to the first measurement metrics, reports the first quality indication information, the first quality indication information includes at least one of: carrier phase continuity indication information, half cycle ambiguity indication information, error indication value indication information, error resolution indication information, and carrier signal quality indication information, and error sampling point quantity indication information and measurement confidence level indication information; the quality indication information such as carrier phase continuity, half cycle ambiguity, an error indication value, an error resolution, a carrier signal quality, the quantity of error sampling points and a measurement confidence level can be reported, and the receiving end may judge the quality and the reliability of the current measurement, and repair or discard the corresponding reported data, etc. UE position deviation caused by positioning calculation performed by the receiving end using the reported value of measurement with a poor quality is avoided, the positioning accuracy and the reliability of the system may be improved, and the problem of low positioning accuracy and the poor reliability caused by incapability of knowing the quality of measurement metric in the carrier phase position scheme in the related art.

The carrier phase continuity indication information is configured to characterize the continuity of the carrier phase measurement metrics or the continuity of a cumulative amount of the carrier phase measurement metrics.

Specifically, the continuity of the carrier phase measurement metrics refers to whether the carrier phase measurement metrics has a cycle slip or not; in case that the cycle slip exists, the carrier phase measurement metrics is discontinuous; in case that no cycle slip exists, the carrier phase measurement metrics is continuous; or the continuity of the cumulative amount of the carrier phase measurement metrics means whether or not there is a cycle slip in the cumulative amount of the carrier phase measurement metrics; in the case that there is the cycle slip, the cumulative amount of the carrier phase measurement metrics is discontinuous; in the case that there is no cycle slip, the cumulative amount of the carrier phase measurement metrics is continuous.

In particular, the cycle slip may be a periodic jump.

In the embodiments of the present disclosure, reporting the first quality indication information includes: adopting 1 bit to represent the carrier phase continuity, wherein in the case that a value of the 1 bit is a first value, it is indicated that a carrier phase is continuous; and in the case that the value of the 1 bit is a second value, it is indicated that the carrier phase is discontinuous.

The first value may be 1 and the second value may be 0; optionally, the first value may be 0, the second value may be 1.

The half cycle ambiguity indication information is configured to indicate whether received data has a half cycle ambiguity.

The half cycle ambiguity means that: in case of abnormal operation of a phase tracking loop, the difference between the carrier phase measurement metrics reported at the current time instant and the carrier phase measurement metrics reported at the immediately previous time instant and the actual phase change of the carrier phase cumulative change between the two time instants may have a difference a half cycle.

Specifically, reporting the first quality indication information includes adopting 1 bit to represent the half cycle ambiguity, wherein in the case that a value of the 1 bit is a first value, it is indicated that the received data has the half cycle ambiguity; and in the case that the value of the 1 bit is a second value, it is indicated that the received data does not have the half cycle ambiguity.

The first value may be 1 and the second value may be 0; optionally, the first value may be 0, the second value may be 1.

In the embodiments of the present disclosure, the error indication value indication information is configured to characterize a first estimation value of a first measurement metrics; and/or, the error resolution indication information is configured to characterize a step length of quantization of an indication field in which an error indication value is located; and/or, the carrier signal quality indication information is configured to characterize a carrier-to-noise ratio (CNR) or a signal-to-noise ratio (SNR) of a carrier on which the first measurement metrics is located, and/or, the error sampling point quantity indication information is configured to characterize the number of the first measurement metrics used in calculating the error indication value.

The first estimation value is a value such as a variance, an average value, etc., estimated based on samples, and is not limited herein.

In the embodiments of the present disclosure, the error indication value indication information may also be configured to characterize the maximum value between the first error value and the second error value, and/or, the error resolution indication information is configured to characterize a step length of quantization of an indication field in which the error indication value is located; and/or, the carrier signal quality indication information is configured to characterize a carrier-to-noise ratio (CNR) or a signal-to-noise ratio (SNR) of the carrier on which the first measurement metrics is located, and/or, the error sampling point quantity indication information is configured to indicate the number of the first measurement metrics used in calculating the error indication value, wherein, the first error value is an error value when an error sampling point of the first measurement metrics is at a first position, and the second error value is an error value when an error sampling point of the first measurement metrics is at a second position. The first position is a position corresponding to a case that an independent variable of a probability density function corresponding to a measurement error value of an error sampling point of the first measurement metrics is $-K \times \sigma$. The second position is a position corresponding to a case that an independent variable of a probability density function corresponding to a measurement error value of an error sampling point of the first measurement metrics is $K \times \sigma$, where K is a natural number, $\sigma$ is the standard deviation statistically obtained according to the measurement error values of at least two error sampling points of the first measurement metrics when the measurement error values of the error sampling points of the first measurement metrics follow a normal distribution.

The measurement error value refers to a measurement error value obtained from the first measurement metrics, i.e., an actually measured value.

In the embodiment of the present disclosure, the measurement confidence level indication information refers to a probability that a measurement error value of an error sampling point of the first measurement metrics is within a preset confidence interval, wherein, the preset confidence interval refers to a preset interval of an independent variable of the probability density function corresponding to the measurement error value of an error sampling point of the first measurement metrics; or, the measurement confidence level indication information refers to the maximum value between a first probability value and a second probability value, wherein, the first probability value is a probability value that a measurement error value of an error sampling point of the first measurement metrics is at a first position, and the second probability value is a probability value that a measurement error value of an error sampling point of the first measurement metrics is at a second position. The first position is a position corresponding to a case that an independent variable of a probability density function corresponding to a measurement error value of an error sampling point of the first measurement metrics is $-K \times \sigma$. The second position is a position corresponding to a case that an independent variable of a probability density function corresponding to a measurement error value of an error sampling point of the first measurement metrics is $K \times \sigma$, where K is a natural number, $\sigma$ is the standard deviation statistically obtained according to the measurement error values of at least two error sampling points of the first measurement metrics when the measurement error values of the error sampling points of the first measurement metrics follow a normal distribution.

In the embodiment of the present disclosure, there is a one-to-one mapping relationship between the first quality indication information and a measurement type of the first measurement metrics.

In the embodiments of the present disclosure, in a case where the first measurement metrics is subject to a normal distribution, the first quality indication information indicates error indication values at ±K×σ; or in a case where the first measurement metrics is subject to a uniform distribution, the first quality indication information indicates an average value of error indication values, wherein K is a natural number and σ is the standard deviation statistically obtained according to the measurement error values of the at least two error sampling points of the first measurement metrics, in a case that the measurement error values of error sampling points of the first measurement metrics follow a normal distribution.

±K×σ here indicates +K×σ and −K×σ. The first quality indication information indicating the error indication values at ±K×σ refers to that the error indication values of the sampling points at the two positions are indicated. The first quality indication information indicating the average value of the error indication values refers to error indication values of all sampling points are included.

Specifically, the first measurement metrics is carrier phase measurement metrics, and the carrier phase measurement metrics includes at least one of an entire cycle phase value and an intra-cycle phase value.

More specifically, sub-messages included in the quality indication information corresponding to the entire cycle phase value are different from at least one of sub-messages included in the quality indication information corresponding to the intra-cycle phase value, wherein, the sub-messages included in the quality indication information include: at least one of carrier phase continuity indication information, half cycle ambiguity indication information, error indication value indication information, and error resolution indication information, and carrier signal quality indication information, error sampling point quantity indication information, and measurement confidence level indication information.

The information indication method provided in the embodiments of the present disclosure is further described below.

In order to solve that above technical problem, the embodiments of the present disclosure provide an information indication method, in particular, a quality indication method of measurement metrics, includes: obtaining first quality indication information according to first measurement metrics; reporting the first quality indication information, wherein, the first quality indication information includes at least one of carrier phase continuity, half cycle ambiguity, an error indication value, an error resolution, a carrier signal quality, the quantity of error sampling points, and a measurement confidence level.

Specifically:
1. Carrier Phase Continuity and Half Cycle Ambiguity.
   (1) The carrier phase continuity included in the first quality indication information refers to the continuity of the carrier phase measurement metrics, or refers to the continuity of the cumulative amount of the carrier phase measurement metrics.
   (2) Specifically, the carrier phase continuity refers to whether or not there is a cycle slip in the carrier phase measurement metrics or the cumulative amount of the carrier phase measurement metrics, and if there is cycle slip, it is considered that the cumulative amount of the carrier phase measurement metrics or the carrier phase measurement metrics is discontinuous; if there is no cycle slip, it means that the cumulative amount of the carrier phase measurement metrics or the carrier phase measurement metrics is continuous.
   (3) 1 bit is used to represent the carrier phase continuity; if there is no cycle slip of the carrier phase since the last report of carrier phase measurement, the carrier phase is continuous and it is necessary to set the corresponding bit to 1 (i.e., the first value is 1); if there is a cycle slip of the carrier phase since the last report of carrier phase measurement, the carrier phase is discontinuous, and it is necessary to set the corresponding bit to 0 (i.e. the second value is 0).
   (4) The first quality indication information includes half cycle ambiguity, the half cycle ambiguity means whether there is the half cycle ambiguity in the data received from a specific sending end.
   (5) Specifically, 1 bit is used to represent the half cycle ambiguity: if there is the half cycle ambiguity of the data received from a particular sending end, the bit corresponding to the half cycle ambiguity is set to 1 (i.e., the first value is 1), and if there is no half cycle ambiguity of the data received from a particular sending end, the bit corresponding to the half cycle ambiguity is set to 0 (i.e., the second value is 0).

2. Three Kinds of Information of the Measurement Quality Indication of the First Measurement Metrics.
   (6) Each first measurement metrics corresponds to a set of measurement quality indication information. The quality indication information (i.e., the first quality indication information) of the first measurement metrics includes: at least one of an error indication value $E_V$, an error resolution $E_R$, a carrier signal quality and the number $E_N$ of error sampling points;
      a) the error indication value $E_V$ is an estimation value of uncertainty of the first measurement metrics (i.e., the first estimation value);
      b) the error resolution $E_R$ refers to a step length of quantization of the indication field where the error indication value $E_V$ is located;
      c) the carrier signal quality refers to the carrier-to-noise ratio (CNR) or the signal-to-noise ratio (SNR) of the carrier on which the first measurement metrics is located;
      d) the number $E_N$ of error sample points refers to the number of first measurement metrics used in calculating the error indication value $E_V$.

3. The Indication Information of Multiplexing the Error Indication Value $E_V$ (that is, the Error Indication Value $E_V$ May Also be Configured to Indicate the Following Information):
   (7) each first measurement metrics corresponds to an error indication value; the error indication value $E_V$ indicates: the maximum value A between the first error value and the second error value, the first error value being for the case that the error sampling point of the first measurement metrics is at the −K×σ position (i.e., the first position) and the second error value being for the case that the error sampling point of the first measurement metrics is at the K×σ position (i.e., the second position):

$$A=\text{Max}(E_S(-K\times\sigma),E_s(K\times\sigma));$$

where K is a natural number and a configured parameter. σ is the standard deviation statistically obtained from the measurement error values of $E_N$ (such as at least two) error sampling points under a condition that the measurement error values of the error sampling points of the first measurement metrics follow the normal distribution. $E_S(-K\times\sigma)$ represents the first error value, and $E_s(K\times\sigma)$ represents the second error value.

4. Introduce the Definition of the Measurement Confidence Level Y.

(8) the definition 1 of the measurement confidence level Y: each first measurement metrics corresponds to one piece of measurement confidence level information; the confidence level Y refers to the probability that the measurement error value $E_s$ of the error sampling point of the first measurement metrics is in the confidence interval $[X_{min}, X_{max}]$, that is:

$$Y=\text{Prob}\{X_{min} \leq E_s \leq X_{max}\};$$

where $X_{min}$ and $X_{max}$ are configuration information. The confidence interval is a preset interval of the independent variables of the probability density function corresponding to the measurement error value of the error sampling point of the first measurement metrics.

(9) the definition 2 of the measurement confidence level Y: each first measurement metrics corresponds to one piece of measurement confidence level information; the confidence level Y refers to the maximum value between a first probability value and a second probability value, the first probability value being a probability value that the measurement error value $E_s$ of the error sampling point of the first measurement metrics is at the $-K\times\sigma$ position (i.e. the first position) and the second probability value being a probability value that the measurement error value $E_s$ of the error sampling point of the first measurement metrics is at the $K\times\sigma$ position (i.e. the second position), that is, $$Y=\text{Max}(\text{Prob}\{E_s(K\times\sigma)\},\text{Prob}\{E_s(-K\times\sigma)\});$$

where K is the configuration information. $\sigma$ is the standard deviation statistically obtained from the measurement error values of $E_N$ (such as at least two) error sampling points under a condition that the measurement error values of the error sampling points of the first measurement metrics follow the normal distribution. $\text{Prob}\{E_s(-K\times\sigma)\}$ represents the first probability value, and $\text{Prob}\{E_s(K\times\sigma)\}$ represents the second probability value.

5. Quality Indication Information has Different Meanings for Different Measurement Metrics:

10) the quality indication information has different meanings for different measurement metrics:
   a) the quality indication information (may be the first quality indication information) indicates error indication values at $\pm K\times\sigma$ when a certain type of measurement metrics (which may be the first measurement metrics) follows the normal distribution, wherein K is a natural number and a configuration parameter. $\sigma$ is the standard deviation statistically obtained from the measurement error values of $E_N$ (such as at least two) error sampling points under a condition that the measurement error values of the error sampling points of the first measurement metrics follow the normal distribution;
   b) the quality indication information indicates the average value of the error indication values when a certain type of measurement metrics follows the uniform distribution;
   c) other circumstances.

(11) there is a one-to-one mapping relationship between measurement metrics quality indication information (i.e., the quality indication information of the measurement metrics) and a measurement metrics type (i.e., the measurement type of the measurement metrics).

6. The First Measurement Metrics May in Particular be a Phase Measurement Metrics:

(12) the first measurement metrics refers to carrier phase measurement metrics, which includes at least one measurement metrics of an entire-cycle phase value and an intra-cycle phase value;

(13) at least one of following quality indication information is different between the entire-cycle phase value and the intra-cycle phase value: the carrier phase continuity, the half cycle ambiguity, the measurement confidence level, the error indication value, the error resolution, the carrier signal quality, and number of error sampling points.

The solutions provided by the embodiments of the present disclosure are illustrated as follow.

Example 1 (Carrier Phase Continuity and Half Cycle Ambiguity)

The solution relates to a quality indication method of measurement metrics, the method includes: obtaining first quality indication information according to the first measurement metrics, and reporting the first quality indication information, wherein the first quality indication information includes information such as the carrier phase continuity and the half cycle ambiguity.

Here, the carrier phase continuity included in the first quality indication information refers to the continuity of the carrier phase measurement metrics or the continuity of the cumulative amount of the carrier phase measurement metrics.

Specifically, the carrier phase continuity refers to whether or not there is the cycle slip of the carrier phase measurement metrics or the cumulative amount of the carrier phase measurement metrics. If there is cycle slip, it is considered that the carrier phase measurement metrics or the cumulative amount of the carrier phase measurement metrics is discontinuous; if there is no cycle slip, it is considered that the carrier phase measurement metrics or the cumulative amount of the carrier phase measurement metrics is continuous.

Specifically, the difference between the carrier phase measurement metrics reported at the current time instant and the carrier phase measurement metrics reported at the immediately previous time instant should be the accumulation of the carrier phase changes during the two time instants. The receiving end obtains the current carrier phase through a phase tracking loop (such as a phase locked loop), and tracks the carrier phase.

When the phase tracking loop is operating properly, the difference between the carrier phase measurement metrics reported at the current time instant and the carrier phase measurement instant reported at the previous time instant is the same as the actual phase change of the cumulative change of the carrier phases between the two time instants, that is, the carrier phase is continuous.

When the phase tracking loop is operating abnormally, the difference between the carrier phase measurement metrics reported at the current time instant and the carrier phase measurement instant reported at the previous time instant may have difference of integer number of cycles than the actual phase change of the cumulative change of the carrier phases between the two time instants. This difference of integer number of cycles is commonly referred to as a carrier phase measurement metrics cycle slip, or referred to as a cycle slip of the cumulative amount of the carrier phase measurement metrics, i.e., the carrier phase is discontinuous.

In this example, 1 bit may be used to represent the carrier phase continuity. If there is no cycle slip of the carrier phase since the last carrier phase measurement report, then the carrier phase is continuous, the bit needs to be set to 1 (that is, the first value is 1); if there is the cycle slip of the carrier phase since the last carrier phase measurement report, then the carrier phase is discontinuous, the bit needs to be set to 0 (i.e., the second value is 0).

The first quality indication information includes the half cycle ambiguity, and the half cycle ambiguity is used to indicate whether the data received from the specific sending end has the half cycle ambiguity.

Specifically, 1 bit may be used to represent the half cycle ambiguity. If the half cycle ambiguity exists in the data received from the specific sending end, the bit corresponding to the half cycle ambiguity is set to 1 (i.e., the first value is 1; if no half cycle ambiguity exist in the data received from the specific sending end, the bit corresponding to the half cycle ambiguity is set to 0 (i.e., the second value is 0).

In case that the network device is a terminal or a base station, when positioning is performed by using a carrier phase method, the terminal or the base station detects a positioning reference signal and uses a phase locked loop to complete carrier phase locking and tracking, the receiver of the terminal and the base station can automatically output the change of the number of full cycles of the carrier phase. However, in the actual radio environment, the positioning reference signal cannot be received by the terminal or the base station due to obstacles, or due to deep channel fading or strong interference, resulting in a SINR (signal-to-interference-noise ratio) of the positioning reference signal is very low, thus causing the receiver to fail to correctly detect the positioning reference signal, and counting the number of full cycles by the receiver is also interrupted, and a slip of the integer number of cycles occurs, that is, "cycle slip." Once the cycle slip is detected by the receiver of the terminal or the base station, the terminal or the base station is required to report information of the cycle slip as the quality indication information to the positioning calculation side (for example, the LMF location server), while reporting the first measurement metrics value. The positioning calculation side performs corresponding processing when performing positioning calculation according to the phase measurement metrics, to obtain an accurate UE positioning value.

Figure 3:
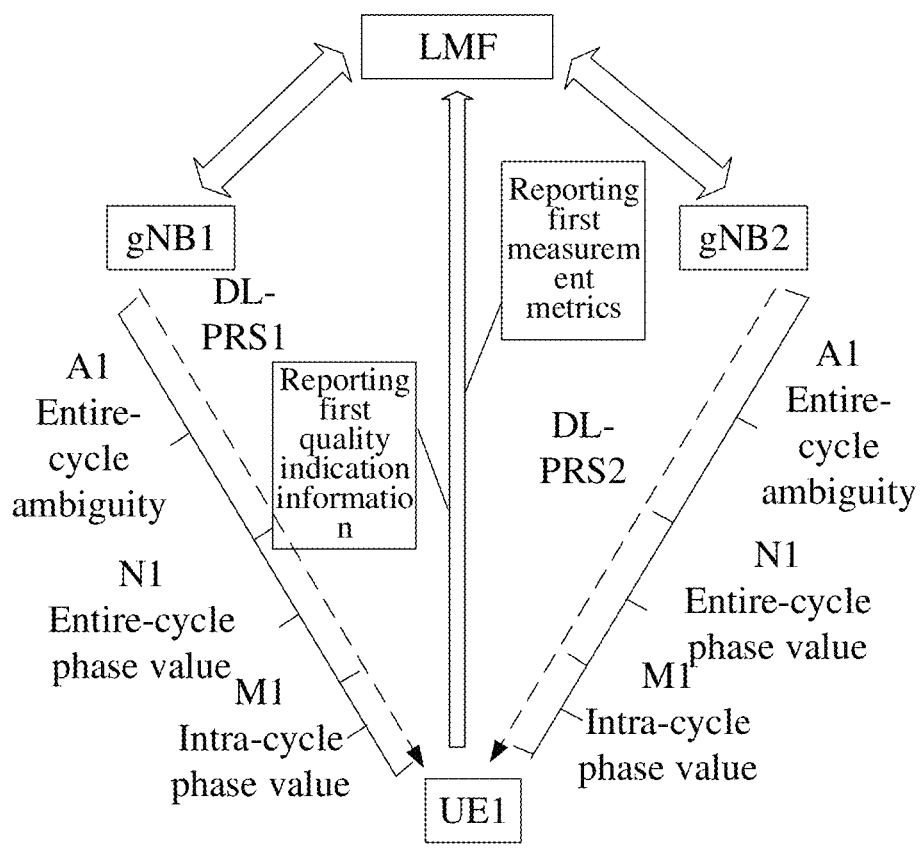
FIG. 3 is a schematic diagram of DL-RSPD according to an embodiment of the present disclosure.

As shown in FIG. 3, base stations gNB1 and gNB2 respectively transmit DL-PRS1 (downlink positioning reference signal 1) and DL-PRS2 (downlink positioning reference signal 2) as downlink positioning reference signals. The terminal UE1 obtains the value of the first measurement metrics by detecting the DL-PRS1 and the DL-PRS2, the value including the entire-cycle phase value and the intra-cycle phase value, and the entire-cycle ambiguity can be obtained by spatial search. Meanwhile, the terminal may further detect whether there is the cycle slip based on information such as priori information, historical phase measurement values, and current phase measurement values, and generate continuity information of carrier phases as the first quality indication information, and report to the LMF together with the first measurement value. The LMF may perform the terminal position calculation based on the reported information.

As can be seen from the above, by using the quality indication method described in this example, the LMF can be assisted in judging the quality and the reliability of this measurement by reporting the quality indication information such as the carrier phase continuity and the half cycle ambiguity, and data repair or discarding is performed accordingly, so that the position deviation of the UE caused by positioning calculation performed by the LMF using the reported measurement value of a poor quality may be avoided, the positioning accuracy of the system is improved.

Example 2 (Three Kinds of Information of the Measurement Quality Indication of the First Measurement Metrics)

The solution relates to a quality indication method of measurement metrics, the method includes: obtaining first quality indication information according to the first measurement metrics, and reporting the first quality indication information, wherein the first quality indication information includes information such as the error indication value, the error resolution, the carrier signal quality, and the number of error sampling points.

Each first measurement metrics corresponds to a set of measurement quality indication information, i.e. the first quality indication information. The quality indication information of the first measurement metrics includes: at least one of an error indication value $E_V$, an error resolution $E_R$, a carrier signal quality and the number $E_N$ of error sampling points;

a) the error indication value $E_v$ is an estimation value of uncertainty of the first measurement metrics (i.e., the first estimation value);

b) the carrier signal quality refers to the carrier-to-noise ratio (CNR) or the signal-to-noise ratio (SNR) of the carrier on which the first measurement metrics is located;

c) the error resolution $E_R$ refers to a step length of quantization of the indication field where the error indication value $E_V$ is located;

d) the number $E_N$ of error sample points refers to the number of first measurement metrics used in calculating the error indication value $E_V$.

Specifically, taking, as an example, the first measurement metrics being the phase measurement metrics, after performing a plurality of times of measurement on the terminal, sample estimation is performed on a plurality of measurement values (that is, the first measurement metrics) to obtain an error indication value $E_v$. The error indication value $E_v$ is an estimation value (i.e., the first estimation value), such as an average value or a standard deviation, of uncertainty of the measurement value. The error indication value $E_v$ is represented by an indication field composed of N bits (specifically, at least one bit), and each code point of the N bits in the indication field represents an error indication value. The code point may be a codepoint, and at least 1 bit can be configured to indicate one codepoint (one state).

The error resolution $E_R$ represents the step length of quantization of the indication field in which the error indication value E is located, which is represented by M bits, and each code point of the M bits represents the step length of the quantization of an error indication value, that is, the difference between two code points of the error indication value $E_v$, the difference is expressed in meters.

The number $E_N$ of error sampling points is the number of measurement values used for calculating the error indication value $E_V$, and is also the number of samples used for sample estimation.

For example, if the number of the currently obtained samples of the first measurement metrics is 100, the error indication value $E_V$ refers to an average error value obtained by performing the sample estimation of measurement values of the 100 samples, and is represented by N=5 bits which may represent $2^5$=32 possible average error values. The error resolution is represented by M=2 bits which can represent 4 possible cases corresponding to {0.05 m, 0.1 m, 0.5 m, 1 m} which are four kinds of error resolution configuration, respectively, so as to meet the indication requirement of positioning accuracy under different scenes. The number $E_N$ of error sampling points is the number of measurement values used in calculating the error indication value $E_V$, and may be 100.

As can be seen from the above, using the quality indication method of the first measurement metrics described in this example, the LMF can be assisted in judging the quality and the reliability of this measurement by reporting the quality indication information through reporting the quality indication information such as the error indication value $E_V$, the error resolution $E_R$, the carrier signal quality, and the number $E_N$ of error sampling points, and data repair or discarding is performed accordingly, so that the position deviation of the UE caused by positioning calculation performed by the LMF using the reported measurement value of a poor quality may be avoided, the positioning accuracy of the system is improved.

Example 3 (Indication Information of Multiplexing the Error Indication Value $E_V$)

The solution relates to a quality indication method of measurement metrics, the method includes: obtaining first quality indication information according to the first measurement metrics, and reporting the first quality indication information, wherein the first quality indication information includes information such as the error indication value, the error resolution, the carrier signal quality, the error sampling point number.

Each first measurement metrics corresponds to an error indication value. The error indication value $E_V$ indicates: the maximum value A between the first error value and the second error value, the first error value being for the case that the error sampling point of the first measurement metrics is at the $-K\times\sigma$ position (i.e., the first position) and the second error value being for the case that the error sampling point of the first measurement metrics is at the $K\times\sigma$ position (i.e., the second position):

$A=\text{Max}(E_S(K\times\sigma), E_s(-K\times\sigma));$ where K is a natural number and a configuration parameter. $\sigma$ is the standard deviation statistically obtained from the measurement error values of $E_N$ (such as at least two) error sampling points under a condition that the measurement error values of the error sampling points of the first measurement metrics follow the normal distribution. $E_S(-K\times\sigma)$ represents the first error value, and $E_s(K\times\sigma)$ represents the second error value.

Using the indication method in this example, the error indication value is no longer an estimation value obtained from samples, but an error value located at a certain statistical position. That is, the error indication value $E_V$ indicates: the maximum value between the error value for the case that the error sampling point of the first measurement metrics is at the $-K\times\sigma$ position and the error value being for the case that the error sampling point of the first measurement metrics is at the $K\times\sigma$ position. Specifically, the pre-condition for adopting the solution may be that the error values of the first measurement metrics follow a normal distribution with a mean value of 0. By reporting the error values at the positions of $\pm K\times\sigma$, the LMF can obtain the error values and the fluctuation of the measurement metrics, thereby avoiding that although the average value of the error value is 0, the fluctuation of the measurement value for this time is actually very large and individual measurement errors are also large, but cannot be indicated in an error indication.

For example, as shown in Table 1, the mean values of both the first set of error values and the second set of error values are 0, but the first set of error values has more significant fluctuation and the error of the actual individual measurement value is higher, then, with respect to the error values at the $\pm K\times\sigma$ positions, the first set of error values is also larger than the second set of error values, so that more accurate error value information can be obtained by the LMF based on the reported error values at the positions of $\pm K\times\sigma$.

TABLE 1 schematic table of a quality indication method for reporting error values at positions of $\pm K \times \sigma$

| Sequence number | First set of error values | Second set of error values |
|---|---|---|
| 1 | −10 | −5 |
| 2 | −8 | −4 |
| 3 | −6 | −3 |
| 4 | −4 | −2 |
| 5 | −2 | −1 |
| 6 | 2 | 1 |
| 7 | 4 | 2 |
| 8 | 6 | 3 |
| 9 | 8 | 4 |
| 10 | 10 | 5 |
| Average | 0 | 0 |

It may be seen from the above that, by using the quality indication method of the first measurement metrics described in this example, the LMF can be assisted in judging the quality and the reliability of this measurement by reporting the quality indication information such as the error values at the $\pm K\times\sigma$ positions, and data repair or discarding is performed accordingly, the problem that inaccurate or incomplete error indication information caused by reporting the error average value only may be avoided, the positioning accuracy of the system is improved.

Example 4 (Introduction of Definition of the Measurement Confidence Level Y)

The solution relates to a quality indication method of measurement metrics, the method includes: obtaining first quality indication information according to the first measurement metrics, and reporting the first quality indication information, wherein the first quality indication information includes information such as the measurement confidence level.

Specifically, there may be two kinds of definitions of the measurement confidence levels.

(1) the definition 1 of the measurement confidence level Y: each first measurement metrics corresponds to one piece of measurement confidence level information; the confidence level Y refers to the probability that the measurement error value $E_s$ of the error sampling point of the first measurement metrics is in the confidence interval $[X_{min}, X_{max}]$, that is:

$Y=\text{Prob}\{X_{min}\leq E_s\leq X_{max}\};$ where $X_{min}$ and $X_{max}$ are configuration information. The confidence interval (i.e., the above preset confidence level) is a preset interval of the independent variables of the probability density function corresponding to the measurement error value of the error sampling point of the first measurement metrics.

(2) the definition 2 of the measurement confidence level Y: each first measurement metrics corresponds to one piece of measurement confidence level information; the confidence level Y refers to the maximum value between a first probability value and a second probability value, the first probability value being a probability value that the measurement error value $E_s$ of the error sampling point of the first measurement metrics is at the $-K \times \sigma$ position (i.e. the first position) and the second probability value being a probability value that the measurement error value $E_s$ of the error sampling point of the first measurement metrics is at the $K \times \sigma$ position (i.e. the second position), that is, $$Y = \mathrm{Max}(\mathrm{Prob}\{E_s(K \times \sigma)\}, \mathrm{Prob}\{E_s(-K \times \sigma)\});$$

where K is the configuration information. $\sigma$ is the standard deviation statistically obtained from the measurement error values of $E_N$ (such as at least two) error sampling points under a condition that the measurement error values of the error sampling points of the first measurement metrics follow the normal distribution. $\mathrm{Prob}\{E_s(-K \times \sigma)\}$ represents the first probability value, and $\mathrm{Prob}\{E_s(K \times \sigma)\}$ represents the second probability value.

Figure 4:
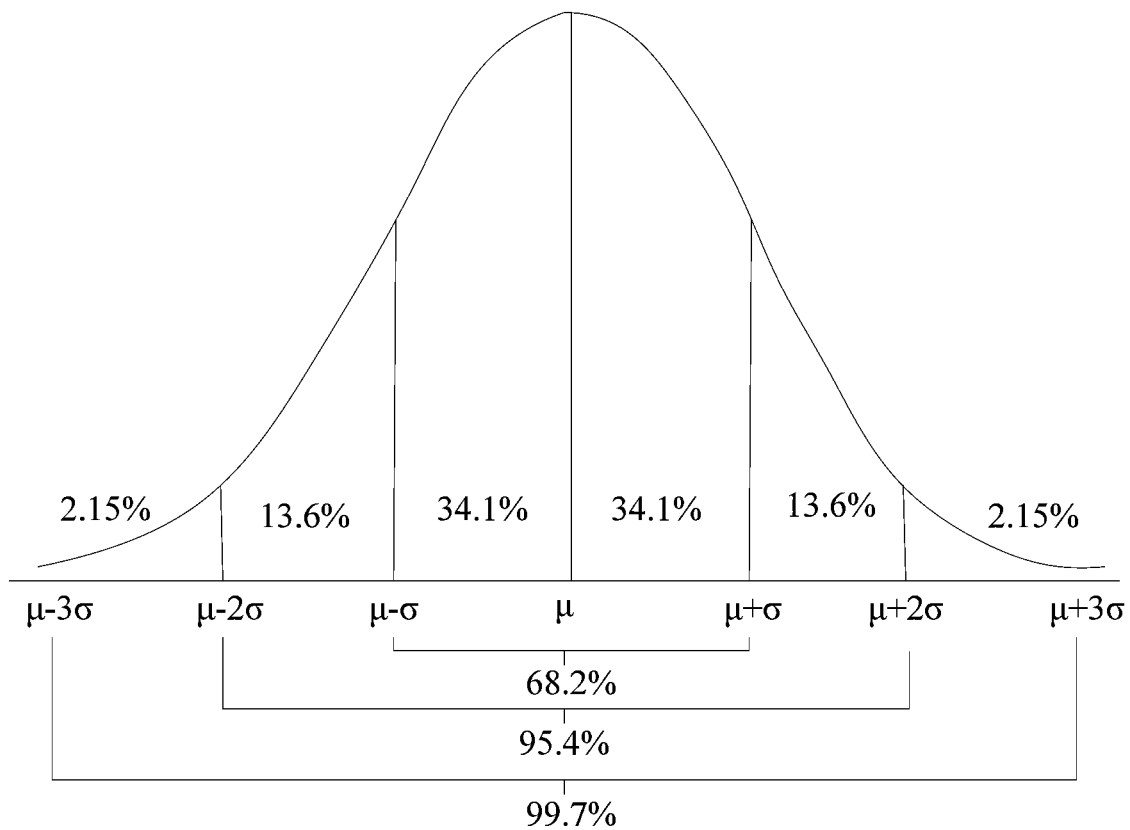
FIG. 4 is a schematic diagram of measurement confidence levels according to an embodiment of the present disclosure.

As shown in FIG. 4, assuming that the error values of the first measurement metrics follow the normal distribution shown in FIG. 4, the definition 2 of the measurement confidence level is adopted, and K=2, then the measurement confidence level Y is calculated according to the following equation:

$$Y = \mathrm{Max}(\mathrm{Prob}\{E_s(-2 \times \sigma)\}, \mathrm{Prob}\{E_s(2 \times \sigma)\})$$

As can be seen from the above, by using the quality indication method of first measurement metrics described in this example, the LMF can be assisted in judging the quality and the reliability of this measurement by reporting the quality indication information such as the measurement confidence level, and data repair or data discarding is performed accordingly, so that the position deviation of the UE caused by positioning calculation performed by the LMF using the reported measurement value of a poor quality may be avoided, the positioning accuracy of the system is improved.

Example 5 (the Quality Indication Information Has Different Meanings for Different Measurement Metrics)

The solution relates to a quality indication method of measurement metrics, the method includes: obtaining first quality indication information according to the first measurement metrics, and reporting the first quality indication information, wherein the first quality indication information includes at least one of: carrier phase continuity, half cycle ambiguity, an error indication value, an error resolution, a carrier signal quality, the number of error sampling points, and a measurement confidence level.

The quality indication information has different meanings for different measurement metrics:

a) the quality indication information (may be the first quality indication information) indicates error indication values at $\pm K \times \sigma$ positions when a certain type of measurement metrics (which may be the first measurement metrics) follows the normal distribution, wherein K is a natural number and a configuration parameter. $\sigma$ is the standard deviation statistically obtained from the measurement error values of $E_N$ (such as at least two) error sampling points under a condition that the measurement error values of the error sampling points of the first measurement metrics follow the normal distribution;

b) the quality indication information indicates the error average value when a certain type of measurement metrics follows the uniform distribution;

c) other circumstances.

Further, there is a one-to-one mapping relationship between measurement metrics quality indication information (i.e., the quality indication information of the measurement metrics) and a measurement metrics type (i.e., the measurement type of the measurement metrics).

By adopting the solution in this example, the meanings of different measurement metrics indication information can be obtained automatically according to the type of measurement metrics through table lookup and mapping, so as to achieve the purpose of automatically matching the meaning of the quality indication information according to the type of measurement metrics.

As can be seen from the above, by using the quality indication method of the first measurement metrics described in this example, the meanings of different measurement metrics indication information can be obtained automatically according to the type of the measurement metrics through table lookup and mapping. Therefore, the purpose of automatically matching the meaning of the quality indication information according to the type of the measurement metrics is realized, the position deviation of the UE caused by mismatch between the quality indication information and the type of measurement metrics is avoided, and the positioning accuracy of the system is improved.

Example 6 (Relevant Signaling of Reporting the Measurement Metrics Quality)

The quality information of the measurement metrics may be reported to a location server together with a measurement result through a location provision message of LPP (LTE Positioning Protocol). The provision of the information may be based on a request from the location server, or may be an active report by the terminal (i.e., for example, the communication device is the terminal).

If the measurement result of the measurement metrics is reported to the base station through an RRC (Radio Resource Control) message, the quality information of the measurement metrics may also be reported to the base station together. The base station then provides the measurement result and the measurement metrics quality information of the measurement metrics through a NRPPa (New Radio Positioning Protocol A) message (that is, the communication device may include the terminal and the base station).

In addition, if the terminal supports reporting the quality information of the measurement metrics, the terminal may report this reporting capability to the location server through a location capability message of the LPP. The positioning server may determine, according to the reporting capability of reporting the measurement metrics quality by the terminal, whether to enable the terminal to report the measurement metrics quality information while reporting the measurement result. The measurement metrics quality information may be the quality information mentioned in Examples 1-5, and the reporting capability of the terminal may be indicated separately for each quality information.

In summary, the solution specifically provides a method of indicating the measurement metrics quality. Relative to the related art, the method of indicating the measurement metrics quality proposed by the present disclosure may assist the receiving end to judge the quality and the reliability of the current measurement and repair or discard the corresponding reported data, through reporting the quality indication information such as the carrier phase continuity, the half cycle ambiguity, the error indication value, the error resolution, the carrier signal quality, the error sampling point quantity and the measurement confidence level, thereby avoiding the position deviation of the UE caused by the positioning calculation performed by the receiving end using the reported measurement value with poor quality, and improving the positioning accuracy of the system.

The quality indication method of the measurement metrics proposed by the present disclosure may also be applied to quality information indication of the measurement metrics in positioning methods such as the time-delay-based DL-TDOA and/or UL-TDOA positioning method and the angle-based DL-AoD and/or UL-AOA positioning method.

Figure 5:
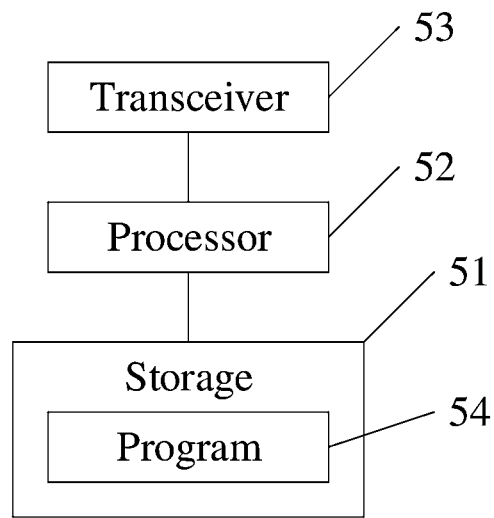
FIG. 5 is a structural schematic diagram of a communication device according to an embodiment of the present disclosure.

An embodiment of the present disclosure also provides a communication device, as shown in FIG. 5. The communication device includes a memory 51, a processor 52, a transceiver 53, and a program 54 stored on the memory 51 and executable on the processor 52, wherein, when the processor 52 executes the program 54, the processor 52 implements the following steps: obtaining first quality indication information according to first measurement metrics; reporting the first quality indication information using the transceiver 53.

The first quality indication information includes at least one of: carrier phase continuity indication information, half cycle ambiguity indication information, error indication value indication information, error resolution indication information, carrier signal quality indication information, and error sampling point quantity indication information and measurement confidence level indication information.

The communication device according to the embodiment of the present disclosure obtains the first quality indication information according to the first measurement metrics, and reports the first quality indication information, wherein, first quality indication information includes at least one of: the carrier phase continuity indication information, the half cycle ambiguity indication information, the error indication value indication information, the error resolution indication information, the carrier signal quality indication information, the error sampling point quantity indication information and the measurement confidence level indication information. By reporting the quality indication information such as the carrier phase continuity indication information, the half cycle ambiguity indication information, the error indication value indication information, the error resolution indication information, the carrier signal quality indication information, the error sampling point quantity indication information and the measurement confidence level indication information, the receiving end may be assisted to judge the quality and the reliability of the current measurement, and repair or discard the corresponding reported data. In this way, the UE position deviation caused by the positioning calculation performed by the receiving end using the reported measurement value with the poor quality is avoided, the positioning accuracy and the reliability of the system are improved, the problem of low positioning accuracy and poor reliability caused by the carrier phase positioning solution in the related art in which the quality of the measurement metrics cannot be known.

The carrier phase continuity indication information is configured to characterize the continuity of the carrier phase measurement metrics or the continuity of a cumulative amount of the carrier phase measurement metrics.

Specifically, the continuity of the carrier phase measurement metrics refers to whether the carrier phase measurement metrics has a cycle slip or not; in case that the cycle slip exists, the carrier phase measurement metrics is discontinuous; in case that no cycle slip exists, the carrier phase measurement metrics is continuous; or the continuity of the cumulative amount of the carrier phase measurement metrics means whether or not there is a cycle slip in the cumulative amount of the carrier phase measurement metrics; in the case that there is the cycle slip, the cumulative amount of the carrier phase measurement metrics is discontinuous; in the case that there is no cycle slip, the cumulative amount of the carrier phase measurement metrics is continuous.

In the embodiments of the present disclosure, the processor is specifically configured to perform following: adopting 1 bit to represent the carrier phase continuity, wherein in the case that a value of the 1 bit is a first value, it is indicated that the carrier phase is continuous; and in the case that the value of the 1 bit is a second value, it is indicated that the carrier phase is discontinuous.

The half cycle ambiguity indication information is configured to indicate whether received data has a half cycle ambiguity.

Specifically, the processor is specifically configured to perform following: adopting 1 bit to represent the half cycle ambiguity, wherein in the case that a value of the 1 bit is a first value, it is indicated that the received data has the half cycle ambiguity; and in the case that the value of the 1 bit is a second value, it is indicated that the received data does not have the half cycle ambiguity.

In the embodiments of the present disclosure, the error indication value indication information is configured to characterize a first estimation value of first measurement metrics; and/or, the error resolution indication information is configured to characterize a step length of quantization of an indication field in which the error indication value is located; and/or, the carrier signal quality indication information is configured to characterize a carrier-to-noise ratio (CNR) or a signal-to-noise ratio (SNR) of a carrier on which the first measurement metrics is located, and/or, the error sampling point quantity indication information is configured to characterize the number of the first measurement metrics used in calculating the error indication value.

In the embodiments of the present disclosure, the error indication value indication information may also be configured to characterize the maximum value between the first error value and the second error value, wherein, the first error value is an error value when an error sampling point of the first measurement metrics is at a first position, and the second error value is an error value when an error sampling point of the first measurement metrics is at a second position. The first position is a position corresponding to a case that an independent variable of a probability density function corresponding to a measurement error value of an error sampling point of the first measurement metrics is $-K \times \sigma$. The second position is a position corresponding to a case that an independent variable of a probability density function corresponding to a measurement error value of an error sampling point of the first measurement metrics is K×σ, where K is a natural number, σ is the standard deviation statistically obtained according to the measurement error values of at least two error sampling points of the first measurement metrics when the measurement error values of the error sampling points of the first measurement metrics follow a normal distribution.

In the embodiments of the present disclosure, the measurement confidence level indication information refers to a probability that a measurement error value of an error sampling point of the first measurement metrics is within a preset confidence interval, wherein, the preset confidence interval refers to a preset interval of an independent variable of the probability density function corresponding to the measurement error value of an error sampling point of the first measurement metrics; or, the measurement confidence level indication information refers to the maximum value between a first probability value and a second probability value, wherein, the first probability value is a probability value that a measurement error value of an error sampling point of the first measurement metrics is at a first position, and the second probability value is a probability value that a measurement error value of an error sampling point of the first measurement metrics is at a second position. The first position is a position corresponding to a case that an independent variable of a probability density function corresponding to a measurement error value of an error sampling point of the first measurement metrics is −K×σ. The second position is a position corresponding to a case that an independent variable of a probability density function corresponding to a measurement error value of an error sampling point of the first measurement metrics is K×σ, where K is a natural number, σ is the standard deviation statistically obtained according to the measurement error values of at least two error sampling points of the first measurement metrics when the measurement error values of the error sampling points of the first measurement metrics follow a normal distribution.

In the embodiments of the present disclosure, there is a one-to-one mapping relationship between the first quality indication information and a measurement type of the first measurement metrics.

In the embodiments of the present disclosure, in a case where the first measurement metrics is subject to a normal distribution, the first quality indication information indicates error indication values at ±K×σ; or in a case where the first measurement metrics is subject to a uniform distribution, the first quality indication information indicates an average value of error indication values, wherein K is a natural number and σ is the standard deviation statistically obtained according to the measurement error values of the at least two error sampling points of the first measurement metrics, in a case that the measurement error values of error sampling points of the first measurement metrics follow a normal distribution.

Specifically, the first measurement metrics is carrier phase measurement metrics, and the carrier phase measurement metrics includes at least one of an entire cycle phase value and an intra-cycle phase value.

More specifically, sub-messages included in the quality indication information corresponding to the entire cycle phase value are different from at least one of sub-messages included in the quality indication information corresponding to the intra-cycle phase value, wherein, the sub-messages included in the quality indication information include: at least one of carrier phase continuity indication information, half cycle ambiguity indication information, error indication value indication information, and error resolution indication information, and carrier signal quality indication information, error sampling point quantity indication information, and measurement confidence level indication information.

The embodiments of the information indication method are all applicable to the embodiments of the communication device, and the same technical effect can be achieved.

The embodiments of the present disclosure also provide a readable storage medium having stored thereon a program. When the program is executed by a processor, the processor implements the steps of the information indication method described above.

The embodiments of the information indication method are all applicable to the embodiments of the readable storage medium, and the same technical effect can be achieved.

Figure 6:
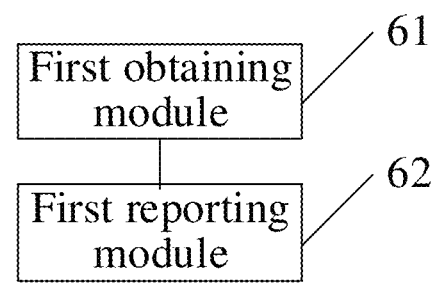
FIG. 6 is a structural schematic diagram of an information indication apparatus according to an embodiment of the present disclosure.

An embodiment of the present disclosure also provides an information indication apparatus applied to a communication device, as shown in FIG. 6. The information indication apparatus includes: a first obtaining module 61, configured to obtain first quality indication information according to first measurement metrics; a first reporting module 62, configured to report the first quality indication information.

The first quality indication information includes at least one of carrier phase continuity indication information, half cycle ambiguity indication information, error indication value indication information, error resolution indication information, and carrier signal quality indication information, and error sampling point quantity indication information and measurement confidence level indication information.

The information indication apparatus provided in the embodiments of the present disclosure obtains the first quality indication information according to the first measurement metrics, and reports the first quality indication information, wherein, first quality indication information includes at least one of: the carrier phase continuity indication information, the half cycle ambiguity indication information, the error indication value indication information, the error resolution indication information, the carrier signal quality indication information, the error sampling point quantity indication information and the measurement confidence level indication information. By reporting the quality indication information such as the carrier phase continuity indication information, the half cycle ambiguity indication information, the error indication value indication information, the error resolution indication information, the carrier signal quality indication information, the error sampling point quantity indication information and the measurement confidence level indication information, the receiving end may be assisted to judge the quality and the reliability of the current measurement, and repair or discard the corresponding reported data. In this way, the UE position deviation caused by the positioning calculation performed by the receiving end using the reported measurement value with the poor quality is avoided, the positioning accuracy and the reliability of the system are improved, the problem of low positioning accuracy and poor reliability caused by the carrier phase positioning solution in the related art in which the quality of the measurement metrics cannot be known.

The carrier phase continuity indication information is configured to characterize the continuity of the carrier phase measurement metrics or the continuity of a cumulative amount of the carrier phase measurement metrics.

Specifically, the continuity of the carrier phase measurement metrics refers to whether the carrier phase measurement metrics has a cycle slip or not; in case that the cycle slip exists, the carrier phase measurement metrics is discontinuous; in case that no cycle slip exists, the carrier phase measurement metrics is continuous; or the continuity of the cumulative amount of the carrier phase measurement metrics means whether or not there is a cycle slip in the cumulative amount of the carrier phase measurement metrics; in the case that there is the cycle slip, the cumulative amount of the carrier phase measurement metrics is discontinuous; in the case that there is no cycle slip, the cumulative amount of the carrier phase measurement metrics is continuous.

In the embodiments of the present disclosure, the first reporting module includes: a first processing sub-module configured to adopt 1 bit to represent continuity of the carrier phase, wherein in the case that a value of the 1 bit is a first value, it is indicated that the carrier phase is continuous; and in the case that the value of the 1 bit is a second value, it is indicated that the carrier phase is discontinuous.

The half cycle ambiguity indication information is configured to indicate whether received data has half cycle ambiguity.

Specifically, the first reporting module includes a second processing sub-module, configured to adopt 1 bit to represent the half cycle ambiguity, wherein in the case that a value of the 1 bit is a first value, it is indicated that the received data has the half cycle ambiguity; and in the case that the value of the 1 bit is a second value, it is indicated that the received data does not have the half cycle ambiguity.

In the embodiments of the present disclosure, the error indication value indication information is configured to characterize a first estimation value of a first measurement metrics; and/or, the error resolution indication information is configured to characterize a step length of quantization of an indication field in which an error indication value is located; and/or, the carrier signal quality indication information is configured to characterize a carrier-to-noise ratio (CNR) or a signal-to-noise ratio (SNR) of a carrier on which the first measurement metrics is located, and/or, the error sampling point quantity indication information is configured to characterize the number of the first measurement metrics used in calculating the error indication value.

In the embodiments of the present disclosure, the error indication value indication information may also be configured to characterize the maximum value between the first error value and the second error value, wherein, the first error value is an error value when an error sampling point of the first measurement metrics is at a first position, and the second error value is an error value when an error sampling point of the first measurement metrics is at a second position. The first position is a position corresponding to a case that an independent variable of a probability density function corresponding to a measurement error value of an error sampling point of the first measurement metrics is $-K \times \sigma$. The second position is a position corresponding to a case that an independent variable of a probability density function corresponding to a measurement error value of an error sampling point of the first measurement metrics is $K \times \sigma$, where K is a natural number, $\sigma$ is the standard deviation statistically obtained according to the measurement error values of at least two error sampling points of the first measurement metrics when the measurement error values of the error sampling points of the first measurement metrics follow a normal distribution.

In the embodiments of the present disclosure, the measurement confidence level indication information refers to a probability that a measurement error value of an error sampling point of the first measurement metrics is within a preset confidence interval, wherein, the preset confidence interval refers to a preset interval of an independent variable of the probability density function corresponding to the measurement error value of an error sampling point of the first measurement metrics; or, the measurement confidence level indication information refers to the maximum value between a first probability value and a second probability value, wherein, the first probability value is a probability value that a measurement error value of an error sampling point of the first measurement metrics is at a first position, and the second probability value is a probability value that a measurement error value of an error sampling point of the first measurement metrics is at a second position. The first position is a position corresponding to a case that an independent variable of a probability density function corresponding to a measurement error value of an error sampling point of the first measurement metrics is $-K \times \sigma$. The second position is a position corresponding to a case that an independent variable of a probability density function corresponding to a measurement error value of an error sampling point of the first measurement metrics is $K \times \sigma$, where K is a natural number, $\sigma$ is the standard deviation statistically obtained according to the measurement error values of at least two error sampling points of the first measurement metrics when the measurement error values of the error sampling points of the first measurement metrics follow a normal distribution.

In the embodiments of the present disclosure, there is a one-to-one mapping relationship between the first quality indication information and a measurement type of the first measurement metrics.

In the embodiments of the present disclosure, in a case where the first measurement metrics is subject to a normal distribution, the first quality indication information indicates error indication values at $\pm K \times \sigma$; or in a case where the first measurement metrics is subject to a uniform distribution, the first quality indication information indicates an average value of error indication values, wherein K is a natural number and $\sigma$ is the standard deviation statistically obtained according to the measurement error values of the at least two error sampling points of the first measurement metrics, in a case that the measurement error values of error sampling points of the first measurement metrics follow a normal distribution.

Specifically, the first measurement metrics is carrier phase measurement metrics, and the carrier phase measurement metrics includes at least one of an entire cycle phase value and an intra-cycle phase value.

More specifically, sub-messages included in the quality indication information corresponding to the entire cycle phase value are different from at least one of sub-messages included in the quality indication information corresponding to the intra-cycle phase value, wherein, the sub-messages included in the quality indication information include: at least one of carrier phase continuity indication information, half cycle ambiguity indication information, error indication value indication information, and error resolution indication information, and carrier signal quality indication information, error sampling point quantity indication information, and measurement confidence level indication information.

The embodiments of the information indication method are all applicable to the embodiments of the information indication apparatus, and the same technical effect can be achieved.

It should be noted that many of the functional components described in this specification are referred to as modules/ sub-modules in order to more particularly emphasize the independence of their implementation.

In the embodiments of the present disclosure, the modules/sub-modules may be implemented in software for execution by various types of processors. For example, an identified executable code module may include one or more physical or logical blocks of computer instructions, which may be constructed as objects, processes, or functions, for example. However, executable codes of the identified modules need not be physically located together, but may include different instructions stored in different bits that, when logically combined together, constitute a module and achieves the specified purpose of the module.

Indeed, the executable codes of the modules may be a single instruction or a number of instructions, and may even be distributed over a number of different code segments, among different programs, and across a number of memory devices. Likewise, operational data may be identified within the module, and may be implemented in any suitable form and organized within any suitable type of data structure. The operational data may be collected as a single data set, or may be distributed across different locations (including on different storage devices), and at least in part may exist only as electronic signals on a system or network.

In consideration of the level of the hardware processes in the related art when the module can be implemented using software, those skilled in the art can build corresponding hardware circuits to implement corresponding functions, without considering the cost. The hardware circuits include conventional very large scale integration (VLSI) circuits or gate arrays and semiconductors or other discrete elements in the related art such as logic chips, transistors, and the like. The modules may also be implemented with programmable hardware devices such as field programmable gate arrays, programmable array logic, programmable logic devices, and the like.

It should be noted that division of the above modules is only a division of logical functions, and in actual implementation, all or part of the modules may be integrated on a physical entity, or may be physically separated. In addition, the modules can be all realized in the form of software invoked by the processing element, or all realized in the form of hardware, or some modules can be realized in the form of software invoked by the processing element and part of the modules is realized in the form of hardware. For example, the determination module may be a separate processing element, or may be integrated into one chip of the device, or may be stored in the memory of the device in the form of program codes, the function of the above determination module is executed by one of the processing elements of the apparatus invoking the program codes. The implementation of the other modules is similar. In addition, all or part of these modules can be integrated together, or can be implemented independently. The processing element described herein may be an integrated circuit having signal processing capabilities. In implementation, the steps of the method described above or the modules described above may be performed by integrated logic circuitry of hardware in the processor element or by instructions in the form of software.

For example, each module, unit, sub-unit, or sub-module may be one or more integrated circuits configured to implement the above methods, such as one or more Application Specific Integrated Circuits (ASIC), or, one or more microprocessors (digital signal processor, DSP), or one or more Field Programmable Gate Arrays (FPGA), etc. In another example, when one of that above modules is implemented in the form of a processing element invoking the program codes, the processing element may be a general purpose processor such as a Central Processing Unit (CPU) or other processors that can call program codes. As another example, these modules may be integrated together and implemented in the form of a system-on-a-chip (SOC).

The terms "first," "second," etc. in the specification and claims of the present disclosure are used to distinguish similar objects and are not necessarily used to describe a particular order or order of precedence. It should be understood that the terms used in this way may be interchanged as appropriate so that the embodiments of the present disclosure described herein, for example, are implemented in order other than those illustrated or described herein. Furthermore, the terms "including" and "having," and any variations thereof, are intended to cover non-exclusive inclusion, for example, processes, methods, systems, products or devices including a series of steps or units need not be limited to those steps or units that are clearly listed, but may include other steps or elements that are not explicitly listed or inherent to these processes, methods, products or devices. In addition, "and/or" as used in the specification and in the claims mean at least one of the connected objects, for example, A and/or B and/or C means seven cases including A alone, B alone, C alone, both A and B exist, both B and C exist, both A and C exist, and both A, B and C exist. Similarly, "at least one of A and B" used in this specification and in the claims should be understood as "A alone, B alone, or both A and B exist."

What has been described above are optional embodiments of the present disclosure, and it should be noted that a number of modifications and embellishments may be made by those of ordinary skill in the art without departing from the principles described herein, these modifications and embellishments are also to be considered within the protection scope of the present disclosure.

What is claimed is:

1. An information indication method performed by a communication device, the method comprising:
   obtaining first quality indication information according to first measurement metrics;
   reporting the first quality indication information;
   wherein, the first quality indication information comprises at least one of following:
   indication information of carrier phase continuity, indication information of half cycle ambiguity, indication information of an error indication value, indication information of an error resolution, indication information of a carrier signal quality, indication information of a quantity of error sampling points, and indication information of a measurement confidence level;
   wherein the indication information of the error indication value is configured to characterize a maximum value between a first error value and a second error value;
   wherein, the first error value is an error value when an error sampling point of the first measurement metrics is at a first position, and the second error value is an error value when an error sampling point of the first measurement metrics is at a second position; the first position is a position corresponding to a case that an independent variable of a probability density function corresponding to a measurement error value of an error sampling point of the first measurement metrics is $-K \times \sigma$, the second position is a position corresponding to a case that an independent variable of a probability density function corresponding to a measurement error value of an error sampling point of the first measurement metrics is K×σ, wherein K is a natural number, σ is a standard deviation statistically obtained according to measurement error values of at least two error sampling points of the first measurement metrics when the measurement error values of the at least two error sampling points of the first measurement metrics follow a normal distribution.

2. The information indication method according to claim 1, wherein the indication information of the carrier phase continuity is configured to characterize continuity of carrier phase measurement metrics or continuity of a cumulative amount of carrier phase measurement metrics.

3. The information indication method according to claim 2, wherein the continuity of the carrier phase measurement metrics means whether the carrier phase measurement metrics has a cycle slip; in case that there is the cycle slip, the carrier phase measurement metrics is discontinuous; in case that there is no cycle slip, the carrier phase measurement metrics is continuous; or the continuity of the cumulative amount of the carrier phase measurement metrics means whether there is a cycle slip in the cumulative amount of the carrier phase measurement metrics; in the case that there is the cycle slip, the cumulative amount of the carrier phase measurement metrics is discontinuous; in the case that there is no cycle slip, the cumulative amount of the carrier phase measurement metrics is continuous.

4. The information indication method according to claim 1, wherein reporting the first quality indication information comprises:

adopting 1 bit to represent the carrier phase continuity, wherein in a case that a value of the 1 bit is a first value, that a carrier phase is continuous is indicated; and in a case that the value of the 1 bit is a second value, that the carrier phase is discontinuous is indicated.

5. The information indication method according to claim 1, wherein the indication information of the half cycle ambiguity is configured to indicate whether received data has the half cycle ambiguity.

6. The information indication method according to claim 5, wherein reporting the first quality indication information comprises:

adopting 1 bit to represent the half cycle ambiguity, wherein in a case that a value of the 1 bit is a first value, that the received data has the half cycle ambiguity is indicated; and in a case that the value of the 1 bit is a second value, that the received data does not have the half cycle ambiguity is indicated.

7. The information indication method according to claim 1, wherein the indication information of the error indication value is configured to characterize a first estimation value of the first measurement metrics; and/or, the indication information of the error resolution is configured to characterize a step length of quantization of an indication field in which the error indication value is located; and/or, the indication information of the carrier signal quality is configured to characterize a carrier-to-noise ratio (CNR) or a signal-to-noise ratio (SNR) of a carrier on which the first measurement metrics is located, and/or, the indication information of the quantity of error sampling points is configured to characterize the quantity of the first measurement metrics used in calculating the error indication value.

8. The information indication method according to claim 1, wherein the indication information of the measurement confidence level means a probability that a measurement error value of an error sampling point of the first measurement metrics is within a preset confidence interval, wherein, the preset confidence interval is a preset interval of an independent variable of a probability density function corresponding to the measurement error value of the error sampling point of the first measurement metrics; or, the indication information of the measurement confidence level means a maximum value between a first probability value and a second probability value, wherein, the first probability value is a probability value that a measurement error value of an error sampling point of the first measurement metrics is at a first position, and the second probability value is a probability value that a measurement error value of an error sampling point of the first measurement metrics is at a second position; the first position is a position corresponding to a case that an independent variable of a probability density function corresponding to a measurement error value of an error sampling point of the first measurement metrics is −K×σ; the second position is a position corresponding to a case that an independent variable of a probability density function corresponding to a measurement error value of an error sampling point of the first measurement metrics is K×σ, wherein K is a natural number, σ is a standard deviation statistically obtained according to measurement error values of at least two error sampling points of the first measurement metrics when the measurement error values of the at least two error sampling points of the first measurement metrics follow a normal distribution.

9. The information indication method according to claim 1, wherein there is a one-to-one mapping relationship between the first quality indication information and a measurement type of the first measurement metrics;

or, in a case where the first measurement metrics follow a normal distribution, the first quality indication information indicates error indication values at ±K×σ; or in a case where the first measurement metrics follow a uniform distribution, the first quality indication information indicates an average value of error indication values, wherein K is a natural number and σ is a standard deviation statistically obtained according to measurement error values of at least two error sampling points of the first measurement metrics, in a case that the measurement error values of the at least two error sampling points of the first measurement metrics follow the normal distribution.

10. An information indication method performed by a communication device, the method comprising:

obtaining first quality indication information according to first measurement metrics;

reporting the first quality indication information;

wherein, the first quality indication information comprises at least one of following:

indication information of carrier phase continuity, indication information of half cycle ambiguity, indication information of an error indication value, indication information of an error resolution, indication information of a carrier signal quality, indication information of a quantity of error sampling points, and indication information of a measurement confidence level;

wherein the first measurement metrics are carrier phase measurement metrics, and the carrier phase measurement metrics comprises an entire cycle phase value, or an intra-cycle phase value, or an entire cycle phase value and an intra-cycle phase value;

wherein, sub-messages comprised in the quality indication information corresponding to the entire cycle phase value are different from at least one of sub-messages comprised in the quality indication information corresponding to the intra-cycle phase value, wherein, the sub-messages comprised in the quality indication information comprise: at least one of following:

the indication information of the carrier phase continuity, the indication information of the half cycle ambiguity, the indication information of the error indication value, the indication information of the error resolution, the indication information of the carrier signal quality, the indication information of the quantity of error sampling points, and the indication information of the measurement confidence level.

11. A communication device comprising: a memory, a processor, a transceiver and a program stored on the memory and executable on the processor, wherein when the processor executes the program, the processor implements following steps:

obtaining first quality indication information according to first measurement metrics;

reporting the first quality indication information using the transceiver;

wherein, the first quality indication information comprises at least one of following:

indication information of carrier phase continuity, indication information of half cycle ambiguity, indication information of an error indication value, indication information of an error resolution, indication information of a carrier signal quality, indication information of a quantity of error sampling points, and indication information of a measurement confidence level;

wherein the indication information of the error indication value is configured to characterize a maximum value between a first error value and a second error value;

wherein, the first error value is an error value when an error sampling point of the first measurement metrics is at a first position, and the second error value is an error value when an error sampling point of the first measurement metrics is at a second position; the first position is a position corresponding to a case that an independent variable of a probability density function corresponding to a measurement error value of an error sampling point of the first measurement metrics is −K×σ, the second position is a position corresponding to a case that an independent variable of a probability density function corresponding to a measurement error value of an error sampling point of the first measurement metrics is K×σ, wherein K is a natural number, σ is a standard deviation statistically obtained according to measurement error values of at least two error sampling points of the first measurement metrics when the measurement error values of the at least two error sampling points of the first measurement metrics follow a normal distribution.

12. The communication device according to claim 11, wherein the indication information of the carrier phase continuity is configured to characterize continuity of carrier phase measurement metrics or continuity of a cumulative amount of carrier phase measurement metrics.

13. The communication device according to claim 12, wherein the continuity of the carrier phase measurement metrics means whether the carrier phase measurement metrics has a cycle slip; in case that there is the cycle slip, the carrier phase measurement metrics is discontinuous; in case that there is no cycle slip, the carrier phase measurement metrics is continuous; or the continuity of the cumulative amount of the carrier phase measurement metrics means whether there is a cycle slip in the cumulative amount of the carrier phase measurement metrics; in the case that there is the cycle slip, the cumulative amount of the carrier phase measurement metrics is discontinuous; in the case that there is no cycle slip, the cumulative amount of the carrier phase measurement metrics is continuous.

14. The communication device according to claim 11, wherein the processor is particularly configured to implement following when executing the program:

adopting 1 bit to represent the carrier phase continuity, wherein in a case that a value of the 1 bit is a first value, that a carrier phase is continuous is indicated; and in a case that the value of the 1 bit is a second value, that the carrier phase is discontinuous is indicated.

15. The communication device according to claim 11, wherein the indication information of the half cycle ambiguity is configured to indicate whether received data has the half cycle ambiguity.

16. The communication device according to claim 15, wherein the processor is particularly configured to implement following when executing the program:

adopting 1 bit to represent the half cycle ambiguity, wherein in a case that a value of the 1 bit is a first value, that the received data has the half cycle ambiguity is indicated; and in a case that the value of the 1 bit is a second value, that the received data does not have the half cycle ambiguity is indicated.

17. The communication device according to claim 11, wherein the indication information of the error indication value is configured to characterize a first estimation value of the first measurement metrics; and/or, the indication information of the error resolution is configured to characterize a step length of quantization of an indication field in which the error indication value is located; and/or, the indication information of the carrier signal quality is configured to characterize a carrier-to-noise ratio (CNR) or a signal-to-noise ratio (SNR) of a carrier on which the first measurement metrics is located, and/or, the indication information of the quantity of error sampling points is configured to characterize the quantity of the first measurement metrics used in calculating the error indication value.

18. The communication device according to claim 11, wherein the indication information of the measurement confidence level means a probability that a measurement error value of an error sampling point of the first measurement metrics is within a preset confidence interval, wherein, the preset confidence interval is a preset interval of an independent variable of a probability density function corresponding to the measurement error value of the error sampling point of the first measurement metrics; or, the indication information of the measurement confidence level means a maximum value between a first probability value and a second probability value, wherein, the first probability value is a probability value that a measurement error value of an error sampling point of the first measurement metrics is at a first position, and the second probability value is a probability value that a measurement error value of an error sampling point of the first measurement metrics is at a second position; the first position is a position corresponding to a case that an independent variable of a probability density function corresponding to a measurement error value of an error sampling point of the first measurement metrics is $-K \times \sigma$; the second position is a position corresponding to a case that an independent variable of a probability density function corresponding to a measurement error value of an error sampling point of the first measurement metrics is $K \times \sigma$, wherein K is a natural number, $\sigma$ is a standard deviation statistically obtained according to measurement error values of at least two error sampling points of the first measurement metrics when the measurement error values of the at least two error sampling points of the first measurement metrics follow a normal distribution.

19. The communication device according to claim 11, wherein there is a one-to-one mapping relationship between the first quality indication information and a measurement type of the first measurement metrics;

or, wherein in a case where the first measurement metrics follow a normal distribution, the first quality indication information indicates error indication values at $\pm K \times \sigma$; or in a case where the first measurement metrics follow a uniform distribution, the first quality indication information indicates an average value of error indication values, wherein K is a natural number and $\sigma$ is a standard deviation statistically obtained according to measurement error values of at least two error sampling points of the first measurement metrics, in a case that the measurement error values of the at least two error sampling points of the first measurement metrics follow the normal distribution.

20. The communication device according to claim 11, wherein the first measurement metrics are carrier phase measurement metrics, and the carrier phase measurement metrics comprise an entire cycle phase value, or an intra-cycle phase value, or an entire cycle phase value and an intra-cycle phase value.

21. The communication device according to claim 20, wherein, sub-messages comprised in the quality indication information corresponding to the entire cycle phase value are different from at least one of sub-messages comprised in the quality indication information corresponding to the intra-cycle phase value, wherein, the sub-messages comprised in the quality indication information comprise: at least one of following:

the indication information of the carrier phase continuity, the indication information of the half cycle ambiguity, the indication information of the error indication value, the indication information of the error resolution, the indication information of the carrier signal quality, the indication information of the quantity of error sampling points, and the indication information of the measurement confidence level.

* * * * *